(12) United States Patent
Yamashita et al.

(10) Patent No.: US 8,794,405 B2
(45) Date of Patent: Aug. 5, 2014

(54) DAMPING FORCE CONTROL TYPE SHOCK ABSORBER

(75) Inventors: Mikio Yamashita, Yokohama (JP); Fumiyuki Yamaoka, Sagamihara (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 158 days.

(21) Appl. No.: 13/338,709

(22) Filed: Dec. 28, 2011

(65) Prior Publication Data

US 2012/0160620 A1 Jun. 28, 2012

(30) Foreign Application Priority Data

Dec. 28, 2010 (JP) ................................. 2010-292241

(51) Int. Cl.
*F16F 9/34* (2006.01)
*B60G 17/08* (2006.01)
*B60G 13/08* (2006.01)

(52) U.S. Cl.
CPC ................ *B60G 17/08* (2013.01); *B60G 13/08* (2013.01)
USPC .................. 188/322.13; 188/317; 188/322.15

(58) Field of Classification Search
USPC ................ 188/280, 281, 282.1, 282.2, 282.3, 188/282.4, 282.5, 282.6, 282.8, 282.9, 283, 188/313, 316, 317, 319.1, 319.2, 322.13, 188/322.15, 322.22
See application file for complete search history.

(56) References Cited

U.S. PATENT DOCUMENTS

| | | | | |
|---|---|---|---|---|
| 4,953,671 A * | 9/1990 | Imaizumi | ................... | 188/282.3 |
| 5,018,608 A * | 5/1991 | Imaizumi | ................. | 188/322.15 |
| 5,324,066 A * | 6/1994 | Masamura et al. | ........ | 280/5.519 |
| 5,360,089 A * | 11/1994 | Nakamura et al. | ......... | 188/266.4 |
| 5,404,973 A * | 4/1995 | Katoh et al. | ............... | 188/282.1 |
| 5,497,862 A * | 3/1996 | Hoya | .......................... | 188/282.5 |
| 5,655,633 A | 8/1997 | Nakadate et al. | | |
| 6,474,454 B2 * | 11/2002 | Matsumoto et al. | ....... | 188/282.6 |
| 7,322,449 B2 * | 1/2008 | Yamaguchi | ................ | 188/282.3 |
| 7,458,448 B2 * | 12/2008 | Katou et al. | .............. | 188/282.6 |
| 7,997,394 B2 * | 8/2011 | Yamaguchi | ................ | 188/282.2 |

FOREIGN PATENT DOCUMENTS

JP 7-332425 12/1995

* cited by examiner

*Primary Examiner* — Bradley King
*Assistant Examiner* — Nicholas J Lane
(74) *Attorney, Agent, or Firm* — Wenderoth, Lind & Ponack, LLP

(57) ABSTRACT

Oil grooves of a shutter and oil holes of a stepped rod constitute first orifices as variable orifices whose opening areas are variable according to the rotational position of the shutter. The oil grooves of the shutter and oil holes of the stepped rod constitute third orifices as variable orifices. Cut portions of inner disk valves constitute second orifices. The opening areas of the variable orifices are changed by rotating the shutter, thereby controlling damping force characteristics in a low piston speed region and the relief pressures of pressure control valves independently of each other, and thus increasing the degree of freedom for adjusting the damping force characteristics.

11 Claims, 9 Drawing Sheets

DAMPING FORCE CONTROL TYPE SHOCK ABSORBER

BACKGROUND OF THE INVENTION

The present invention relates to damping force control type shock absorbers suitably used to damp vibrations of automobiles, for example.

In vehicles such as four-wheeled automobiles, a damping force control type hydraulic shock absorber is generally provided between a wheel-side member and a vehicle body-side member to damp vertical vibrations, etc. generated during running of the vehicle. This damping force control type hydraulic shock absorber uses an actuator to vary the orifice area through which a hydraulic fluid passes, thereby enabling damping force generated to be properly adjusted over a range of from low damping force to high damping force. Japanese Patent Application Publication No. Hei 07-332425 discloses an example of the actuator, in which a shutter serving as a variable orifice is rotated to control the damping force characteristics of a damping valve in a low piston speed region and also control the relief pressure of the damping valve (valve-opening pressure of the damping valve).

The above-described damping force control type hydraulic shock absorber disclosed in Japanese Patent Application Publication No. Hei 07-332425 uses a single variable orifice to control both the damping force characteristics of the damping valve in the low piston speed region and the relief pressure (valve-opening pressure) of the damping valve and therefore cannot control the damping force characteristics in the low piston speed region and the relief pressure independently of each other. Consequently, the degree of freedom for controlling the damping force characteristics is small, and it is difficult to properly adjust the damping force characteristics at each position over a range of from "soft" characteristics to "hard" characteristics. The difficulties in the adjustment of damping force characteristics may be compensated for by software control. Such a solution to the problem, however, will result in an increased cost.

There is a related-art technique having two variable orifices. With this technique, however, it is also difficult to properly adjust the damping force characteristics over the entire piston speed range of from a low piston speed region to a high piston speed region. In addition, because the flow rate of hydraulic fluid flowing through the variable orifices is high for the structural reason, the fluid force tends to increase. Therefore, a step-cut is likely to occur in the control of damping force characteristic.

SUMMARY OF THE INVENTION

The present invention has been made in view of the above-described problems with the related art. Accordingly, an object of the present invention is to provide a damping force control type shock absorber capable of controlling the damping force characteristics in the low piston speed region and the relief pressure of the damping valve independently of each other and hence capable of properly adjusting the damping force characteristics.

A damping force control type shock absorber according to the present invention includes a cylinder having a hydraulic fluid sealed therein. The shock absorber further includes a piston slidably fitted in the cylinder to define two chambers in the cylinder and a piston rod secured at one end thereof to the piston. The other end of the piston rod projects out of the cylinder. Further, the shock absorber includes a first passage, a second passage and a third passage, through which the hydraulic fluid flows from either one of the two chambers in the cylinder toward the other chamber in response to movement of the piston in one direction, a main damping valve provided in the first passage to suppress a flow of the hydraulic fluid induced by the movement of the piston to generate a damping force, a first orifice provided in the second passage, a second orifice provided in the second passage downstream of the first orifice, a back pressure chamber supplied with a pressure between the first orifice and the second orifice to urge the main damping valve in a direction for closing the valve, and a third orifice provided in the third passage. At least either one of the first orifice and the second orifice and the third orifice are externally adjustable variable orifices.

According to the present invention, damping force characteristics in the low piston speed region and the relief pressure (valve-opening pressure) of the main damping valve can be controlled independently of each other by the externally adjustable variable orifices, and it is possible to increase the degree of freedom for controlling the damping force characteristics. Thus, the relief pressure of the main damping valve can be variably regulated without changing damping force characteristics in the low piston speed region, and damping force characteristics in the low piston speed region can be variably regulated without changing the relief pressure.

DETAILED DESCRIPTION OF THE INVENTION

The following embodiments present not only the above-described technical problems and advantageous effects of the present invention but also various other solutions to problems and advantages. Principal problems that the following embodiments solve, including those stated above, will be listed below.

[Characteristics Improvement]

When damping force characteristics (damping force with respect to the piston speed) are changed from one to another in accordance with vibration conditions, it is demanded, for example, that the damping force characteristics should be changed as smoothly as possible. The reason for this is as follow. If switching abruptly occurs between damping force characteristics that generate small damping force and damping force characteristics that generate large damping force, damping forces actually generated also abruptly switch from one to another, which degrades the vehicle ride quality. If switching of damping forces occurs during the steering of the vehicle, the behavior of the vehicle becomes unstable, so that the driver may feel uneasy about the steering operation. Under these circumstances, studies have been made to allow damping force characteristics to be changed as smoothly as possible, as disclosed in the above-mentioned Japanese Patent Application Publication No. Hei 07-332425. In this regard, however, further characteristics improvement has been demanded.

[Suppression of Upsizing]

A frequency-dependent mechanism needs an area for a free piston to move up and down. Therefore, as the area for the free piston is increased, the axial length of the cylinder apparatus increases. As the cylinder apparatus increases in size, the degree of freedom with which the cylinder apparatus can be mounted to the vehicle body lowers. Therefore, the increase in axial length of the cylinder apparatus is a serious problem. If the cylinder apparatus is equipped with a mechanism of controlling damping force externally, the apparatus unavoidably increases in size by an amount corresponding to the size of the mechanism. Therefore, downsizing of the frequency-dependent mechanism section is strongly demanded.

[Reduction of Parts Count]

The frequency-dependent mechanism requires constituent parts such as a housing and a free piston in addition to a piston. Therefore, the number of parts increases. An increased parts count has adverse effects on productivity, durability, reliability, and so forth. Accordingly, it is desired to reduce the parts count while attaining desired characteristics, i.e. damping force characteristics corresponding to a wide range of vibration frequencies.

Damping force control type shock absorbers according to embodiments of the present invention will be explained below in detail with reference to the accompanying drawings by way of an example in which the present invention is applied to a damping force control type hydraulic shock absorber for a vehicle.

Figure 1:
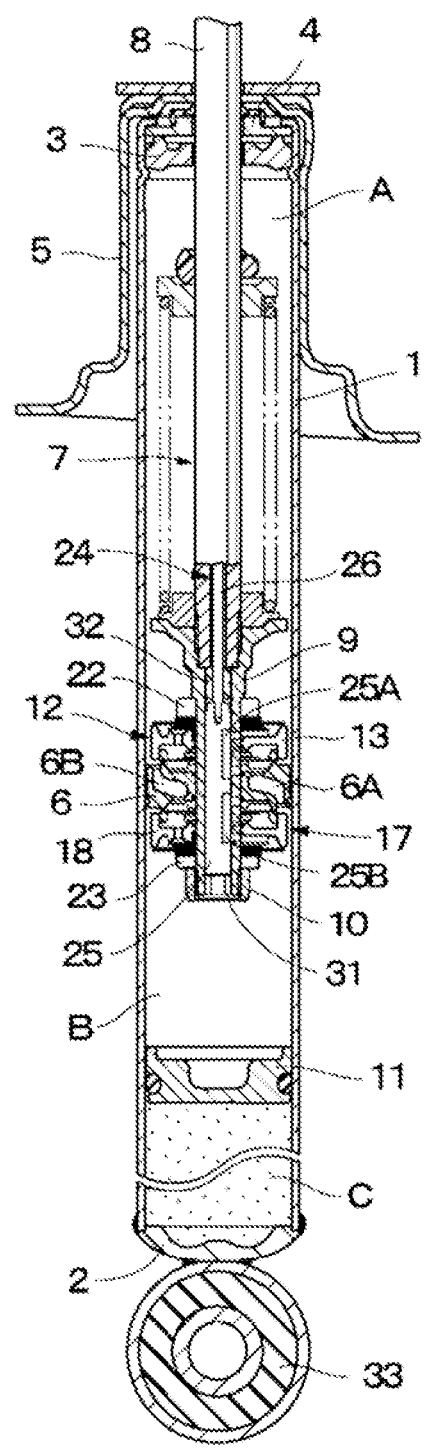
FIG. 1 is a vertical sectional view of a damping force control type hydraulic shock absorber according to a first embodiment of the present invention.

FIGS. 1 to 9 show a first embodiment of the present invention. In FIG. 1, a circular cylindrical cylinder 1 forms an outer shell of a mono-tube damping force control type hydraulic shock absorber. The lower end of the cylinder 1 is closed by a bottom cap 2. At the upper end of the cylinder 1, a rod guide 3 that guides a piston rod 7 (described later) is provided, and an upper cap 4, a spring retainer 5, etc. are installed in such a manner as to cover the rod guide 3. The spring retainer 5 supports, from below, a suspension spring (not shown) of a vehicle.

Reference numeral 6 denotes a piston slidably fitted in the cylinder 1. The piston 6 divides the interior of the cylinder 1 into two chambers, i.e. a rod-side oil chamber A and a bottom-side oil chamber B. The piston 6 has a plurality of circumferentially spaced oil paths 6A and a plurality of circumferentially spaced oil paths 6B, which allow communication between the rod-side oil chamber A and the bottom-side oil chamber B. The oil paths 6A and 6B are sloped oil holes extending obliquely to the axis of the piston 6. The oil paths 6A and 6B constitute a first passage through which a hydraulic oil as a hydraulic fluid flows between the rod-side oil chamber A and the bottom-side oil chamber B.

The upper end surface of the piston 6 is provided with an annular recess 6C surrounding the upper openings of the oil paths 6A and further provided with an annular valve seat 6D located radially outside the annular recess 6C. A main disk 14A (described later) selectively seats on and unseats from the annular valve seat 6D. The lower end surface of the piston 6 is provided with an annular recess 6E surrounding the lower openings of the oil paths 6B and further provided with an annular valve seat 6F located radially outside the annular recess 6E. A main disk 19A (described later) selectively seats on and unseats from the annular valve seat 6F.

Reference numeral 7 denotes a piston rod extending axially in the cylinder 1. The piston rod 7 has a tubular rod 8 having a lower end as one end thereof inserted in the cylinder 1. The piston rod 7 further has a stepped rod 9 connected to the one end (lower end) of the tubular rod 8 by thread engagement. The lower end of the stepped rod 9, which is one end of the piston rod 7, has the piston 6 secured thereto by tightening a nut 10 and so forth. The upper end of the tubular rod 8, which is the other end of the piston rod 7, projects out of the cylinder 1 through the rod guide 3, the upper cap 4, and so forth. The nut 10 is used to secure the stepped rod 9 to the piston 6 and also used to detachably secure a compression damping mechanism 12 and an extension damping mechanism 17, which will be described later, to the upper and lower sides, respectively, of the piston 6 by tightening the nut 10.

Figure 2:
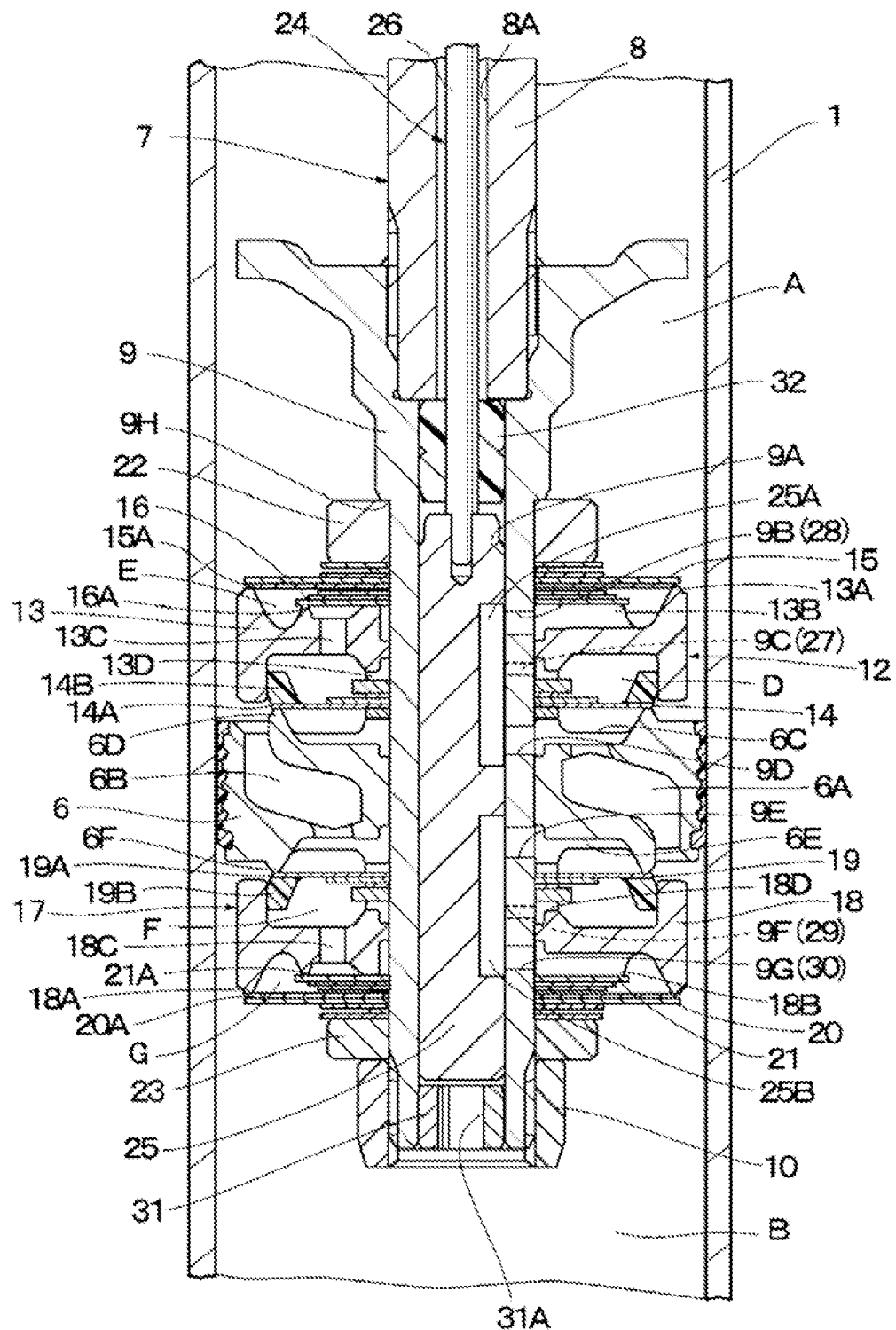
FIG. 2 is an enlarged vertical sectional view showing a piston, extension and compression damping mechanisms, and so forth in FIG. 1.
Figure 3:
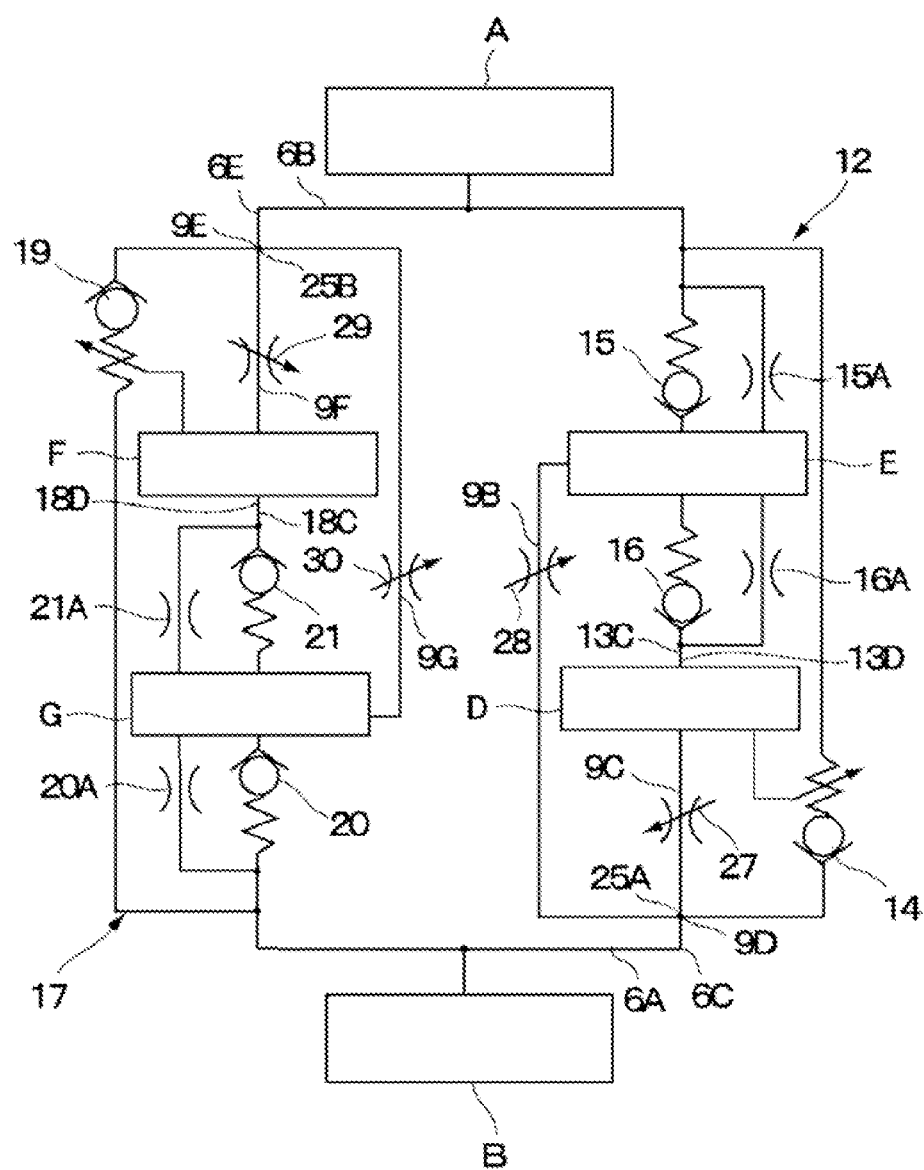
FIG. 3 is a circuit block diagram of the damping force control type hydraulic shock absorber according to the first embodiment.

As shown in FIG. 2, the tubular rod 8 is provided with a rod insertion hole 8A axially extending through the inner periphery thereof. The rod insertion hole 8A has a control rod 26 (described later) inserted therein with a clearance therebetween. The stepped rod 9 is provided at the inner periphery thereof with a shutter fitting hole 9A opening at the lower end of the stepped rod 9. The shutter fitting hole 9A has a shutter 25 (described later) rotatably fitted therein. The upper end of the shutter fitting hole 9A vertically communicates with the rod insertion hole 8A of the tubular rod 8. The rod insertion hole 8A and the shutter fitting hole 9A are disposed at respective positions where their axes substantially coincide with each other.

The stepped rod 9 of the piston rod 7 is, as shown in FIG. 2, provided with axially spaced groups of a plurality of circumferentially spaced oil holes 9B, 9C, 9D, 9E, 9F and 9G extending radially outward from the shutter fitting hole 9A. Among the oil holes 9B to 9G, the oil holes 9B to 9D are disposed in the rod-side oil chamber A defined in the cylinder 1 by the piston 6. The remaining oil holes 9E to 9G are disposed in the bottom-side oil chamber B in the cylinder 1. The oil holes 9D constantly communicate with the annular recess 6C located on the upper end surface of the piston 6. The oil holes 9E constantly communicate with the annular recess 6E located on the lower end surface of the piston 6.

Among the oil holes 9B to 9G, the uppermost oil holes 9B are selectively brought into and out of communication with the annular recess 6C of the piston 6 and the oil holes 9D through oil grooves 25A of a shutter 25 (described later). Among the oil holes 9B to 9G, the lowermost oil holes 9G are selectively brought into and out of communication with the annular recess 6E of the piston 6 and the oil holes 9E through oil grooves 25B of the shutter 25.

The oil holes 9C and 9F, which are shown by the dotted lines in FIG. 2, are disposed at different positions from the oil holes 9B and 9G in the circumferential direction of the stepped rod 9. The oil holes 9C are selectively brought into and out of communication with the annular recess 6C of the piston 6 and the oil holes 9D through the oil grooves 25A of the shutter 25. The oil holes 9F are selectively brought into and out of communication with the annular recess 6E of the piston 6 and the oil holes 9E through the oil grooves 25B of the shutter 25.

Further, the stepped rod 9 has an annular stepped portion 9H formed on the outer periphery thereof to allow a spacer 22 (described later) to be axially positioned thereto.

Reference numeral 11 denotes a free piston slidably fitted in the cylinder 1 between the piston 6 and the bottom cap 2. The free piston 11 defines a gas chamber C in the bottom end of the cylinder 1. The gas chamber C has a pressurized gas sealed therein.

The free piston 11 is axially slidingly displaced in the cylinder 1 so as to compress or expand the gas chamber C by an amount corresponding to an amount by which the piston rod 7 enters or exits from the cylinder 1. In other words, the free piston 11 compresses the gas chamber C so as to compensate for a reduction in volume caused by the piston rod 7 entering the cylinder 1, and expands the gas chamber C so as to compensate for an increase in volume caused by the piston rod 7 exiting from the cylinder 1.

Figure 9:
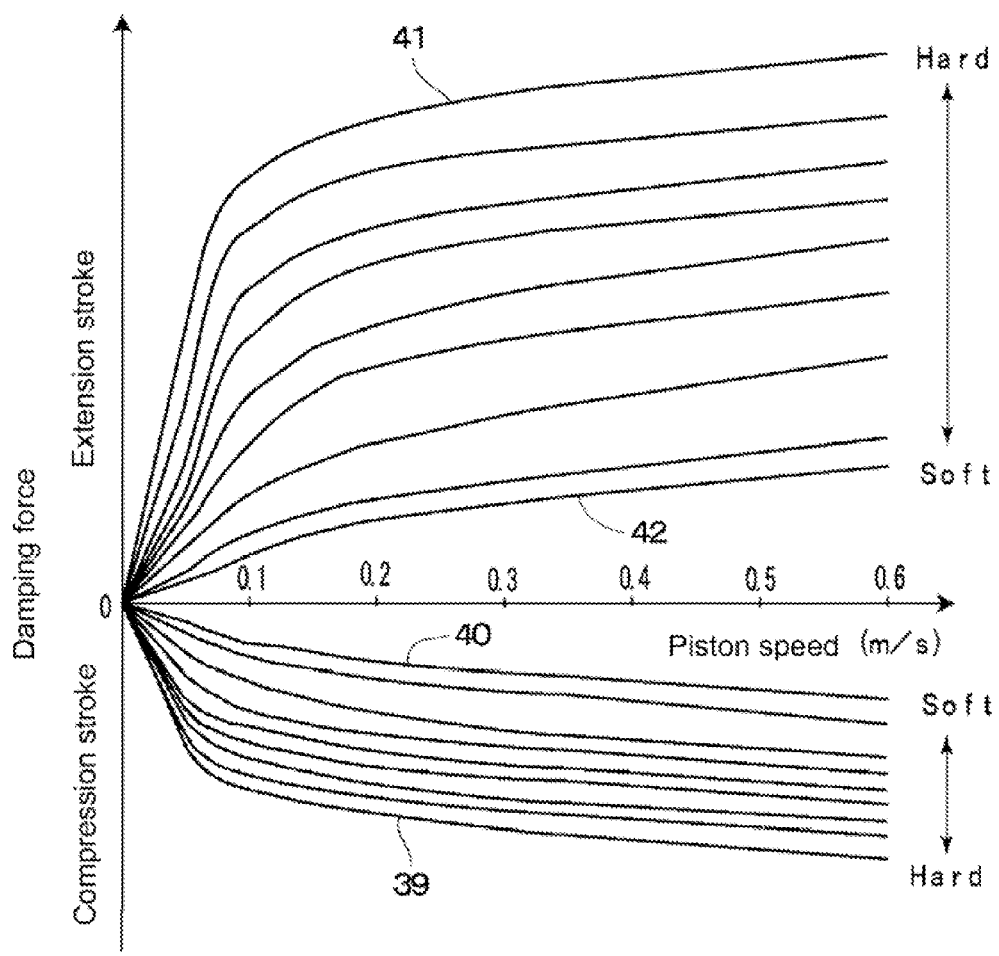
FIG. 9 is a characteristic chart showing the damping force characteristics of the damping force control type hydraulic shock absorber according to the first embodiment.

Reference numeral 12 denotes a compression damping force generating mechanism (hereinafter referred to as "compression damping mechanism 12") used in this embodiment. The compression damping mechanism 12 is, as shown in FIG. 2, located in the rod-side oil chamber A of the cylinder 1 and secured to the upper side of the piston 6. When the piston 6 is slidingly displaced downward in the cylinder 1 during the compression stroke of the piston rod 7, the compression damping mechanism 12 offers resistance to the hydraulic oil flowing from the bottom-side oil chamber B toward the rod-side oil chamber A through the oil paths 6A and annular recess 6C of the piston 6, the oil holes 9D of the stepped rod 9, the oil grooves 25A of the shutter 25 (described later), and so forth, thereby generating compression damping force with characteristics as shown in FIG. 9, for example.

The compression damping mechanism 12 has an upper casing member 13 in the shape of a cylinder, an upper end of which is closed, a pressure control valve 14, an outer disk valve 15 and an inner disk valve 16, which will be described later, and so forth. The upper casing member 13 is secured to the outer periphery of the stepped rod 9 between a spacer 22 (described later) and the piston 6. The pressure control valve 14 has an elastic seal member 14B (described later) fitted to the lower end surface of the upper casing member 13 with an interference. A compression pilot chamber D serving as an annular back pressure chamber is formed between the pressure control valve 14 and the upper casing member 13.

Figure 4:
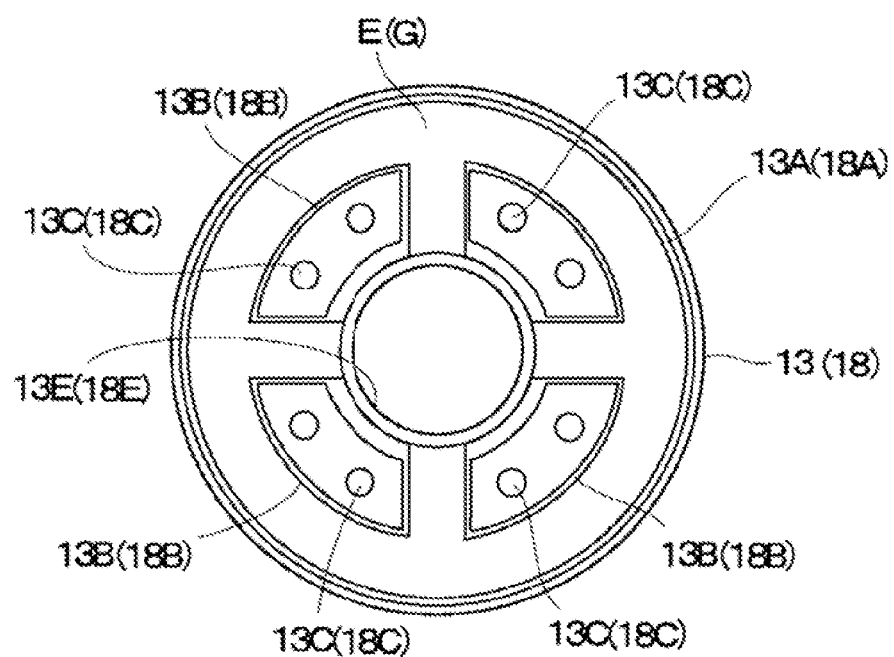
FIG. 4 is a plan view showing an upper casing member in FIG. 2 as a single component.

The upper casing member 13 of the compression damping mechanism 12 is provided with an annular valve seat 13A, sectorial valve seats 13B, oil holes 13C as axial oil paths, and oil grooves 13D as radial oil paths. The annular valve seat 13A is formed on an upper end surface of the upper casing member 13. The outer disk valve 15 selectively seats on and unseats from the annular valve seat 13A. There are provided a plurality (four in total as shown in FIG. 4) of sectorial valve seats 13B formed in a fan shape at respective positions radially inside the annular valve seat 13A and one step lower than the upper end surface of the upper casing member 13. The inner disk valve 16 (described later) selectively seats on and unseats from the sectorial valve seats 13B. The oil holes 13C are bored inside the sectorial valve seats 13B. Through the oil holes 13C, the compression pilot chamber D communicates with the inner regions of the sectorial valve seats 13B. The oil grooves 13D allow the compression pilot chamber D to constantly communicate with the oil holes 9C.

In addition, the upper casing member 13 has, as shown in FIG. 4, a rod insertion hole 13E bored in the center thereof. The upper casing member 13 is fitted to the stepped rod 9 through the rod insertion hole 13E.

The pressure control valve 14 has a main disk 14A selectively seating on and unseating from the annular valve seat 6D of the piston 6 and an annular elastic seal member 14B secured to the outer periphery of the upper side of the main disk 14A by vulcanization bonding, baking or other similar method. The elastic seal member 14B is formed in the shape of a thick-walled ring by using an elastic material such as rubber to liquid-tightly seal the compression pilot chamber D, which is inside the elastic seal member 14B, with respect to the rod-side oil chamber A, which is outside the elastic seal member 14B.

The main disk 14A of the pressure control valve 14 constitutes a compression main damping valve, which is a constituent feature of the present invention. The pressure control valve 14 operates as follows. When a pressure difference between the bottom-side oil chamber B (annular recess 6C) and the compression pilot chamber D increases to a predetermined relief pressure set value during the compression stroke of the piston rod 7, the main disk 14A unseats from the annular valve seat 6D to generate a predetermined compression damping force. When the pressure control valve 14 (main disk 14A) opens, the oil chambers A and B communicate with each other through the oil paths 6A of the piston 6. Thus, a first passage, which is a constituent feature of the present invention, is formed.

The outer disk valve 15 constitutes a compression first sub-damping valve. A compression pressure-receiving chamber E is formed between the upper end surface of the upper casing member 13 and the outer disk valve 15 at a position radially inside the annular valve seat 13A. The compression pressure-receiving chamber E forms a junction located downstream of a second orifice (cut portions 16A) and a third orifice 28, which will be described later. The outer disk valve 15 is provided downstream of the junction. The outer disk valve 15, which selectively seats on and unseats from the annular valve seat 13A, opens when the pressure in the compression pressure-receiving chamber E increases to a predetermined set pressure with respect to the rod-side oil chamber A. On occasions other than the above, the outer disk valve 15 seats on the annular valve seat 13A and is thus kept closed.

In addition, the outer disk valve 15 has small cut portions 15A (fixed orifice) constituting a compression fifth orifice between the outer disk valve 15 and the annular valve seat 13A. The cut portions 15A allow the hydraulic oil in the compression pressure-receiving chamber E to flow toward the rod-side oil chamber A even when the outer disk valve 15 is closed. The outer disk valve 15 has valve characteristics as shown by the characteristic curve 37 in FIG. 7. Thus, a differential pressure $\Delta P$ is generated between the compression pressure-receiving chamber E and the rod-side oil chamber A corresponding to the flow rates Q of hydraulic oil flowing upstream and downstream, respectively, of the outer disk valve 15. It should be noted that the fixed orifice (cut portions 15A) may be provided in the annular valve seat 13A.

Reference numeral 16 denotes an inner disk valve provided in the compression pressure-receiving chamber E of the upper casing member 13 to constitute a compression second sub-damping valve. The inner disk valve 16 selectively unseats from and seats on the sectorial valve seats 13B of the upper casing member 13 to selectively bring the compression pilot chamber D in the upper casing member 13 and the oil holes 13C into and out of communication with the compression pressure-receiving chamber E. The inner disk valve 16 has minute cut portions 16A (fixed orifice) constituting a compression second orifice between the inner disk valve 16 and the sectorial valve seats 13B. The cut portions 16A have a smaller flow path area than that of the cut portions 15A of the outer disk valve 15. The relationship in flow path area between the cut portions 16A and the cut portions 15A of the outer disk valve 15, i.e. 16A<15A, allows an improvement in the linearity of damping force characteristics. However, the flow path area of the cut portions 16A and that of the cut portions 15A may be set equal to each other (16A=15A). Alternatively, the above-described relationship in flow path area between the cut portions 16A and the cut portions 15A may be reversed (16A>15A). It should be noted that the fixed orifice (cut portions 16A) may be provided in the sectorial valve seats 13B.

Figure 8:
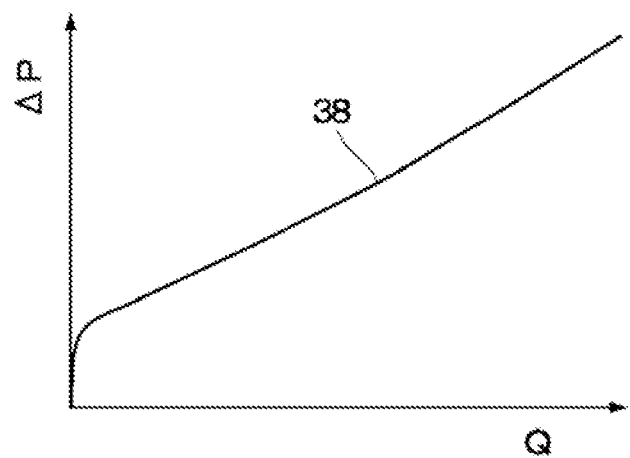
FIG. 8 is a characteristic chart showing the valve characteristics of an inner disk valve.

The inner disk valve 16 has valve characteristics as shown by the characteristic curve 38 in FIG. 8. A differential pressure ΔP is generated between the compression pilot chamber D and the compression pressure-receiving chamber E corresponding to the flow rates Q of hydraulic oil flowing upstream and downstream of the inner disk valve 16. The cut portions 16A allow the hydraulic oil in the compression pilot chamber D to flow from the oil holes 13C toward the compression pressure-receiving chamber E even when the inner disk valve 16 is closed.

The cut portions 16A improve the damping force rising characteristics in the low piston speed region and increases the slope of the damping force characteristic curve because the cut portions 16A are positioned in series to the cut portions 15A of the outer disk valve 15.

Reference numeral 17 denotes an extension damping force generating mechanism (hereinafter referred to as "extension damping mechanism 17") used in this embodiment. The extension damping mechanism 17 is, as shown in FIG. 2, located in the bottom-side oil chamber B of the cylinder 1 and secured to the lower side of the piston 6. When the piston 6 is slidingly displaced upward in the cylinder 1 during the extension stroke of the piston rod 7, the extension damping mechanism 17 offers resistance to the hydraulic oil flowing from the rod-side oil chamber A toward the bottom-side oil chamber B through the oil paths 6B and annular recess 6E of the piston 6, the oil holes 9E to 9G of the stepped rod 9, the oil grooves 25B of the shutter 25 (described later), and so forth, thereby generating extension damping force with characteristics as shown in FIG. 9, for example.

The extension damping mechanism 17 has a lower casing member 18 in the shape of a cylinder, a lower end of which is closed, a pressure control valve 19, an outer disk valve 20 and an inner disk valve 21, which will be described later, and so forth. The lower casing member 18 is secured to the outer periphery of the stepped rod 9 between a spacer 23 (described later) and the piston 6. The pressure control valve 19 has an elastic seal member 19B (described later) fitted to the upper end surface of the lower casing member 18 with an interference. The pressure control valve 19 forms an extension pilot chamber F as an annular back pressure chamber between the pressure control valve 19 and the lower casing member 18.

The lower casing member 18 of the extension damping mechanism 17 has substantially the same structure as that of the upper casing member 13 of the compression damping mechanism 12. As shown exemplarily in FIG. 4, the lower casing member 18 has an annular valve seat 18A, a plurality of sectorial valve seats 18B, oil holes 18C as axial oil paths, and oil grooves 18D as radial oil paths. In addition, the lower casing member 18 has, as shown in FIG. 4, a rod insertion hole 18E bored in the center thereof. The lower casing member 18 is fitted to the stepped rod 9 through the rod insertion hole 18E.

The pressure control valve 19 has substantially the same structure as that of the pressure control valve 14 of the compression damping mechanism 12. The pressure control valve 19 has a main disk 19A selectively seating on and unseating from the annular valve seat 6F of the piston 6 and an annular elastic seal member 19B secured to the outer periphery of the lower side of the main disk 19A. The pressure control valve 19 constitutes an extension main damping valve, which is a constituent feature of the present invention.

The pressure control valve 19 operates as follows. When a pressure difference between the rod-side oil chamber A (annular recess 6E) and the extension pilot chamber F increases to a predetermined relief pressure set value during the extension stroke of the piston rod 7, the main disk 19A unseats from the annular valve seat 6F to generate a predetermined extension damping force. When the pressure control valve 19 (main disk 19A) opens, the oil chambers A and B communicate with each other through the oil paths 6B of the piston 6. Thus, an extension first passage, which is a constituent feature of the present invention, is formed.

The outer disk valve 20 constitutes an extension first sub-damping valve. An extension pressure-receiving chamber G is formed between the lower end surface of the lower casing member 18 and the outer disk valve 20 at a position radially inside the annular valve seat 18A. The extension pressure-receiving chamber G forms a junction located downstream of a second orifice (cut portions 21A) and a third orifice 30, which will be described later. The outer disk valve 20 is provided downstream of the junction. The outer disk valve 20, which selectively seats on and unseats from the annular valve seat 18A, opens when the pressure in the extension pressure-receiving chamber G increases to a predetermined set pressure. On occasions other than the above, the outer disk valve 20 seats on the annular valve seat 18A and is thus kept closed.

In addition, the outer disk valve 20 has small cut portions 20A (fixed orifice) constituting an extension fifth orifice between the outer disk valve 20 and the annular valve seat 18A. The cut portions 20A allow the hydraulic oil in the extension pressure-receiving chamber G to flow toward the bottom-side oil chamber B when the outer disk valve 20 is closed. The outer disk valve 20 has valve characteristics as shown by the characteristic curve 37 in FIG. 7. That is, as shown by the characteristic curve 37 in FIG. 7, a differential pressure ΔP is generated between the extension pressure-receiving chamber G and the bottom-side oil chamber B corresponding to the flow rates Q of hydraulic oil flowing upstream and downstream, respectively, of the outer disk valve 20. It should be noted that the fixed orifice (cut portions 20A) may be provided in the annular valve seat 18A.

Reference numeral 21 denotes an inner disk valve provided in the extension pressure-receiving chamber G of the lower casing member 18 to constitute an extension second sub-damping valve. The inner disk valve 21 selectively unseats from and seats on the sectorial valve seats 18B of the lower casing member 18 to selectively bring the extension pilot chamber F in the lower casing member 18 and the oil holes 18C into and out of communication with the extension pressure-receiving chamber G. The inner disk valve 21 has minute cut portions 21A (fixed orifice) constituting an extension second orifice between the inner disk valve 21 and the sectorial valve seats 18B. The cut portions 21A have a smaller flow path area than that of the cut portions 20A of the outer disk valve 20. The relationship in flow path area between the cut portions 21A and the cut portions 20A of the outer disk valve 20, i.e. 20A>21A, allows an improvement in the linearity of damping force characteristics. However, the flow path area of the cut portions 21A and that of the cut portions 20A may be set equal to each other (21A=20A). Alternatively, the above-described relationship in flow path area between the cut portions 21A and the cut portions 20A may be reversed (20A<21A). It should be noted that the fixed orifice (cut portions 21A) may be provided in the sectorial valve seats 18B.

The inner disk valve 21 has valve characteristics as shown by the characteristic curve 38 in FIG. 8. A differential pressure ΔP is generated between the extension pilot chamber F and the extension pressure-receiving chamber G corresponding to the flow rates of hydraulic oil flowing upstream and downstream of the inner disk valve 21. The cut portions 21A allow the hydraulic oil in the extension pilot chamber F to flow from the oil holes 18C toward the extension pressure-receiving chamber G even when the inner disk valve 21 is closed. The cut portions 21A improve the damping force rising characteristics in the low piston speed region and increases the slope of the damping force characteristic curve because the cut portions 21A are positioned in series to the cut portions 20A of the outer disk valve 20.

Reference numeral 22 denotes a spacer provided between the stepped portion 9H of the stepped rod 9 and the upper casing member 13. The spacer 22 is an annular ring or the like fitted on the outer periphery of the stepped rod 9. The spacer 22 clamps the outer and inner disk valves 15 and 16 of the compression damping mechanism 12 between itself and the upper casing member 13 to stabilize the valve-opening and -closing operations of the outer and inner disk valves 15 and 16.

Reference numeral 23 denotes another spacer provided between the lower casing member 18 of the extension damping mechanism 17 and the nut 10. The spacer 23 is also an annular ring or the like fitted on the outer periphery of the stepped rod 9. The spacer 23 clamps the outer and inner disk valves 20 and 21 of the extension damping mechanism 17 between itself and the lower casing member 18 to stabilize the valve-opening and -closing operations of the outer and inner disk valves 20 and 21.

Reference numeral 24 denotes a passage area varying mechanism 24 used in this embodiment. The passage area varying mechanism 24 has a shutter 25, a control rod 26, and an actuator (not shown), e.g. a stepping motor, which will be described later. The actuator of the passage area varying mechanism 24 is provided on the projecting end of the tubular rod 8, for example, to rotate the shutter 25 through the control rod 26. Although in this embodiment an actuator is used to rotate the shutter 25 through the control rod 26, the shutter 25 may be adjusted by hand.

Reference numeral 25 denotes a shutter provided in the shutter fitting hole 9A of the stepped rod 9. The shutter 25 constitutes flow control valves from opening area varying members of the passage area varying mechanism 24, i.e. variable orifices 27, 28, 29 and 30, which will be descried later. The shutter 25 is fitted to the lower end of the control rod 26 so as to rotate together with the control rod 26 as one unit, and the shutter 25 is rotated, together with the control rod 26, in the shutter fitting hole 9A of the stepped rod 9. The control rod 26 is inserted in the rod insertion hole 8A of the stepped rod 9, and the upper end of the control rod 26 is connected to an output shaft (not shown) of the actuator.

The outer peripheral surface of the shutter 25 is provided with compression oil grooves 25A formed as axially extending U-grooves and extension oil grooves 25B axially spaced from the oil grooves 25A and formed as axially extending U-grooves. The oil grooves 25A of the shutter 25 are positioned to radially face the oil holes 9B, 9C and 9D of the stepped rod 9, as shown in FIG. 2, to selectively bring the oil holes 9D into and out of communication with the oil holes 9B and 9C according to the rotational position of the shutter 25.

A compression second passage, which is a constituent feature of the present invention, comprises the oil paths 6A of the piston 6, which communicate with the bottom-side oil chamber B, the annular recess 6C, the oil holes 9D of the stepped rod 9, the oil grooves 25A of the shutter 25, the oil holes 9C of the stepped rod 9, the compression pilot chamber D, the oil holes 13C of the upper casing member 13 and the cut portions 16A of the inner disk valve 16. The oil grooves 25A of the shutter 25 and the oil holes 9C of the stepped rod 9, which are provided halfway the second passage, constitute a compression first orifice 27 as a variable orifice whose opening area is variably adjusted according to the rotational position of the shutter 25. The cut portions 16A of the inner disk valve 16 form a fixed orifice constituting a compression second orifice.

A compression third passage, which is a constituent feature of the present invention, comprises the oil paths 6A of the piston 6, which communicate with the bottom-side oil chamber B, the annular recess 6C, the oil holes 9D of the stepped rod 9, the oil grooves 25A of the shutter 25, the oil holes 9B of the stepped rod 9, the compression pressure-receiving chamber E and the cut portions 15A of the outer disk valve 15. The oil grooves 25A of the shutter 25 and the oil holes 9B of the stepped rod 9, which are provided halfway the third passage, constitute a compression third orifice 28 as a variable orifice whose opening area is variably adjusted according to the rotational position of the shutter 25. The cut portions 15A of the outer disk valve 15 form a fixed orifice constituting a compression fifth orifice.

Figure 5:
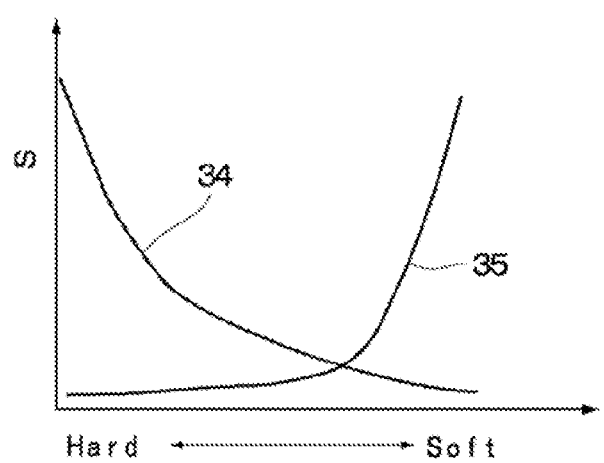
FIG. 5 is a characteristic chart showing the relationship between damping force generated by variable orifices and the opening area of a shutter.

The relationship between damping force generated by the compression damping valve (pressure control valve 14, outer disk valve 15 and inner disk valve 16) and the opening area S of the shutter 25 (oil grooves 25A) with respect to the oil holes 9C of the stepped rod 9 (i.e. the passage area of the first orifice 27) is set as shown by the characteristic curve 34 in FIG. 5.

That is, when the opening area S of the oil holes 9C (i.e. the passage area of the first orifice 27) is increased by rotating the shutter 25, the pressure (back pressure) in the compression pilot chamber D increases relatively, so that it becomes difficult for the main disk 14A to open. At this time, the hydraulic oil flows from the oil holes 13C of the upper casing member 13 into the compression pressure-receiving chamber E through the cut portions 16A of the inner disk valve 16. Accordingly, damping force of "hard" damping characteristics is generated by the cut portions 16A, which have a small flow path area.

When the opening area S of the oil holes 9C (i.e. the passage area of the first orifice 27) is reduced by rotating the shutter 25, the pressure (back pressure) in the compression pilot chamber D reduces relatively, so that it becomes easy for the main disk 14A to open. At this time, the flow rate of hydraulic oil flowing from the oil holes 13C through the cut portions 16A of the inner disk valve 16 also reduces. Therefore, damping force of "soft" damping characteristics is generated by the cut portions 16A.

On the other hand, the relationship between damping force and the opening area S of the shutter 25 (oil grooves 25A) with respect to the oil holes 9B of the stepped rod 9 (i.e. the passage area of the third orifice 28) is set as shown by the characteristic curve 35 (described later) in FIG. 5. That is, when the opening area S of the oil holes 9B (i.e. the passage area of the third orifice 28) is increased by rotating the shutter 25, the flow rate of hydraulic oil flowing from the oil grooves 25A of the shutter 25 into the compression pressure-receiving chamber E through the oil holes 9B increases. At this time, the hydraulic oil flows into the rod-side oil chamber A through the cut portions 15A of the outer disk valve 15.

In this case, when the passage area of the third orifice 28 is increased, the flow rate of hydraulic oil flowing through the cut portions 16A of the inner disk valve 16 is substantially zero, and the hydraulic oil flows only through the cut portions 15A of the outer disk valve 15. Accordingly, damping force of "soft" damping characteristics is generated.

On the other hand, when the opening area of the oil holes 9B (i.e. the passage area of the third orifice 28) is reduced by rotating the shutter 25, the flow rate of hydraulic oil flowing from the oil grooves 25A of the shutter 25 into the compression pressure-receiving chamber E through the oil holes 9B reduces. At this time, the greater part of hydraulic oil flows from the oil holes 9C toward the pilot chamber D. Consequently, the pressure (back pressure) in the compression pilot chamber D increases relatively. At this time, the hydraulic oil flows from the oil holes 13C of the upper casing member 13 into the compression pressure-receiving chamber E through the cut portions 16A of the inner disk valve 16 and flows into the rod-side oil chamber A through the cut portions 15A of the outer disk valve 15. Thus, the hydraulic oil flows through the two groups of cut portions 16A and 15A in series. Accordingly, damping force of "hard" damping characteristics is generated.

An extension second passage, which is a constituent feature of the present invention, comprises the oil paths 6B of the piston 6, which communicate with the rod-side oil chamber A, the annular recess 6E, the oil holes 9E of the stepped rod 9, the oil grooves 25B of the shutter 25, the oil holes 9F of the stepped rod 9, the extension pilot chamber F, the oil holes 18C of the lower casing member 18 and the cut portions 21A of the inner disk valve 21.

The oil grooves 25B of the shutter 25 and the oil holes 9F of the stepped rod 9, which are provided halfway the second passage, constitute an extension first orifice 29 as a variable orifice whose opening area is variably adjusted according to the rotational position of the shutter 25. The cut portions 21A of the inner disk valve 21 form a fixed orifice constituting an extension second orifice.

An extension third passage, which is a constituent feature of the present invention, comprises the oil paths 6B of the piston 6, which communicate with the rod-side oil chamber A, the annular recess 6E, the oil holes 9E of the stepped rod 9, the oil grooves 25B of the shutter 25, the oil holes 9G of the stepped rod 9, the extension pressure-receiving chamber G and the cut portions 20A of the outer disk valve 20.

The oil grooves 25B of the shutter 25 and the oil holes 9G of the stepped rod 9, which are provided halfway the third passage, constitute an extension third orifice 30 as a variable orifice whose opening area is variably adjusted according to the rotational position of the shutter 25. The cut portions 20A of the outer disk valve 20 form a fixed orifice constituting an extension fifth orifice.

The relationship between damping force generated by the extension damping valve (pressure control valve 19, outer disk valve 20 and inner disk valve 21) and the opening area of the shutter 25 (oil grooves 25B) with respect to the oil holes 9F of the stepped rod 9 (i.e. the passage area of the first orifice 29) is set in the same way as shown by the above-mentioned compression characteristic curve 34 (see FIG. 5). That is, when the opening area (i.e. the passage area of the first orifice 29) is increased, damping force of "hard" damping characteristics is generated. When the opening area (i.e. the passage area of the first orifice 29) is reduced, damping force of "soft" damping characteristics is generated.

On the other hand, the relationship between damping force and the opening area of the shutter 25 (oil grooves 25B) with respect to the oil holes 9G of the stepped rod 9 (i.e. the passage area of the third orifice 30) is set in the same way as shown by the above-mentioned compression characteristic curve 35 (see FIG. 5). That is, when the opening area (i.e. the passage area of the third orifice 30) is increased, damping force of "soft" damping characteristics is generated. When the opening area (i.e. the passage area of the third orifice 30) is reduced, damping force of "hard" damping characteristics is generated.

The shutter fitting hole 9A of the stepped rod 9 is provided therein with a tubular member 31 at the lower end (one end in the axial direction) of the shutter 25. A cylindrical tubular member 32 is provided at the upper end (the other end in the axial direction) of the shutter 25 in the shutter fitting hole 9A. The tubular members 32 and 31 constitute axially positioning members, respectively, which prevent the shutter 25 from moving upward or downward in the shutter fitting hole 9A. The inner periphery of the tubular member 31 defines an inner bore 31A.

The following is an explanation of the operation of the damping force control type hydraulic shock absorber according to the first embodiment arranged as stated above.

To mount the damping force control type hydraulic shock absorber onto a vehicle, the upper end of the tubular rod 8 is secured to a vehicle body-side member, and a mounting eye 33 (see FIG. 1) provided on the bottom cap 2 is secured to a wheel-side member. During running of the vehicle, when vertical vibrations are caused by unevenness on the road surface or the like, the piston rod 7 is displaced to extend from and withdraw into the outer tube 1. Consequently, damping forces can be generated by the compression damping mechanism 12, the extension damping mechanism 17, and so forth. Thus, the vibrations of the vehicle can be damped.

More specifically, during the compression stroke of the piston rod 7, the piston rod 7 enters the cylinder 1, and the pressure in the bottom-side oil chamber B becomes higher than in the rod-side oil chamber A. Consequently, the hydraulic oil in the bottom-side oil chamber B flows into the oil grooves 25A of the shutter 25 from the oil paths 6A of the piston 6 through the annular recess 6C and the oil holes 9D of the stepped rod 9. Then, the hydraulic oil flows into the compression pilot chamber D and/or the compression pressure-receiving chamber E through the oil holes 9C and/or oil holes 9B of the stepped rod 9.

When the damping force characteristics are set to "hard" by rotating the shutter 25 of the passage area varying mechanism 24, the opening area of the oil holes 9C (i.e. the passage area of the first orifice 27) is increased by the shutter 25 to the level of substantially fully open as shown by the characteristic curve 34 in FIG. 5, and the opening area of the oil holes 9B (i.e. passage area of the third orifice 28) is reduced by the shutter 25 to the level of substantially fully closed as shown by the characteristic curve 35.

In this state, the greater part of hydraulic oil flows into the compression pilot chamber D from the oil grooves 25A of the shutter 25 through the oil holes 9C (first orifice 27). Therefore, the pressure difference (differential pressure) between the annular recess 6C of the piston 6 and the compression pilot chamber D reduces relatively. Consequently, the pressure control valve 14 is brought into a state where the valve-opening pressure (i.e. relief set pressure) of the main disk 14A is set high. Accordingly, the hydraulic oil flowing into the compression pilot chamber D flows into the compression pressure-receiving chamber E from the oil holes 13C of the upper casing member 13 through the cut portions 16A of the inner disk valve 16, thereby enabling damping force of "hard" damping characteristics to be generated through the cut portions 16A having a small flow path area.

In this case, the cut portions 16A of the inner disk valve 16, which are formed with a small flow path area, can improve the damping force rising characteristics in the low piston speed region and increase the slope of the damping force characteristic curve as shown by the compression damping force characteristic curve 39 in FIG. 9.

The hydraulic oil passing through the cut portions 16A of the inner disk valve 16 flows into the compression pressure-receiving chamber E and further flows into the rod-side oil chamber A from the compression pressure-receiving chamber E through the cut portions 15A of the outer disk valve 15.

Next, as the contraction speed of the piston rod 7 gradually increases in the above-described state, the flow rate of hydraulic oil flowing through the oil holes 9C (first orifice 27), which are substantially fully open, increases, and a longitudinal differential pressure corresponding to the flow rate is generated in the oil holes 9C. That is, the oil holes 9C stop the increase in pressure in the compression pilot chamber D. Accordingly, the differential pressure between the annular recess 6C of the piston 6 and the compression pilot chamber D also gradually increases. Consequently, the opening area S, i.e. the degree of valve opening, of the main disk 14A of the pressure control valve 14 changes according to the differential pressure $\Delta P$ as shown by the characteristic curve 36 in FIG. 6. When the pressure control valve 14 is open, compression damping force substantially proportional to the piston speed is generated as shown by the compression damping force characteristic curve 39 in FIG. 9.

When the damping force characteristics are set to "soft" by rotating the shutter 25 of the passage area varying mechanism 24, the opening area of the oil holes 9C (i.e. the passage area of the first orifice 27) is reduced by the shutter 25 to the level of substantially fully closed as shown by the characteristic curve 34 in FIG. 5, and the opening area of the oil holes 9B (i.e. passage area of the third orifice 28) is increased by the shutter 25 to the level of substantially fully open as shown by the characteristic curve 35.

In this state, the greater part of hydraulic oil flows into the compression pressure-receiving chamber E from the oil grooves 25A of the shutter 25 through the oil holes 9B (third orifice 28), and the pressure (back pressure) in the compression pilot chamber D reduces relatively. Therefore, the differential pressure between the annular recess 6C of the piston 6 and the compression pilot chamber D increases, and consequently, the pressure control valve 14 is brought into a state where the valve-opening pressure (i.e. relief set pressure) of the main disk 14A is set low.

Moreover, the greater part of hydraulic oil flows directly into the compression pressure-receiving chamber E from the oil holes 9B without flowing into the compression pilot chamber D, i.e. without flowing through the cut portions 16A of the inner disk valve 16, and further flows into the rod-side oil chamber A through the cut portions 15A of the outer disk valve 15. Because the hydraulic oil does not flow through the cut portions 16A of the inner disk valve 16, damping force of "soft" damping characteristics can be generated as shown by the compression characteristic curve 40 in FIG. 9. Regarding damping force characteristics in the low piston speed region, the slope of the damping force characteristic curve can be reduced because the greater part of hydraulic oil flows through the outer disk valve 15 of low stiffness.

Figure 6:
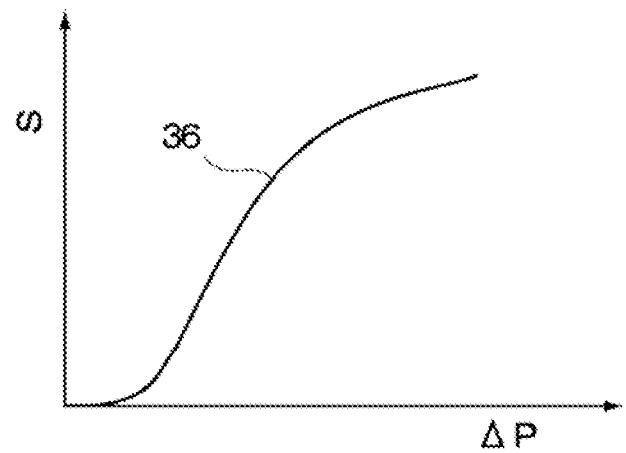
FIG. 6 is a characteristic chart showing the valve-opening characteristics of a pressure control valve.
Figure 7:
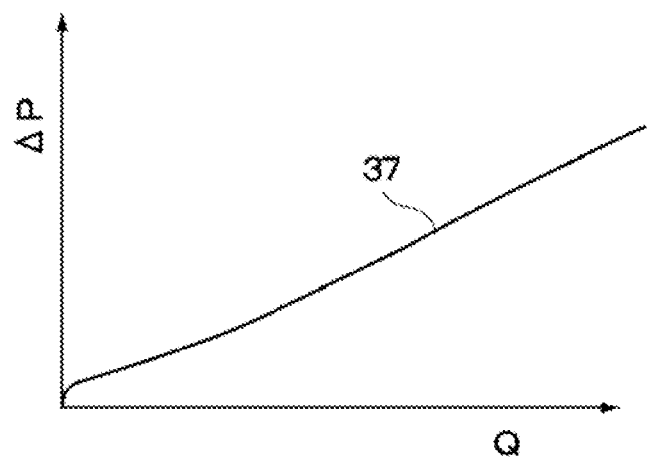
FIG. 7 is a characteristic chart showing the valve characteristics of an outer disk valve.

As the contraction speed of the piston rod 7 gradually increases in the above-described state, the main disk 14A of the pressure control valve 14, whose relief pressure has been set low as stated above, opens, and the opening area S thereof changes according to the differential pressure $\Delta P$ as shown by the characteristic curve 36 in FIG. 6. When the pressure control valve 14 is open, damping force of "soft" damping characteristics substantially proportional to the piston speed is generated as shown by the compression characteristic curve 40 in FIG. 9. As a result of the relief pressure of the pressure control valve 14 being set low, damping force characteristics of low valve-opening pressure can be obtained.

Next, during the extension stroke of the piston rod 7, the pressure in the rod-side oil chamber A becomes higher than in the bottom-side oil chamber B. Accordingly, the hydraulic oil in the rod-side oil chamber A flows into the oil grooves 25B of the shutter 25 from the oil paths 6B of the piston 6 through the annular recess 6E and the oil holes 9E of the stepped rod 9. Then, the hydraulic oil flows into the extension pilot chamber F and/or the extension pressure-receiving chamber G through the oil holes 9F and/or oil holes 9G of the stepped rod 9.

When the damping force characteristics are set to "hard" by rotating the shutter 25 of the passage area varying mechanism 24, the opening area of the oil holes 9F (i.e. the passage area of the first orifice 29) is increased by the shutter 25 to the level of substantially fully open as shown by the characteristic curve 35 in FIG. 5, and the opening area of the oil holes 9G (i.e. passage area of the third orifice 30) is reduced by the shutter 25 to the level of substantially fully closed as shown by the characteristic curve 35.

In this state, the greater part of hydraulic oil flows into the extension pilot chamber F from the oil grooves 25B of the shutter 25 through the oil holes 9F (first orifice 29). Therefore, the differential pressure between the annular recess 6E of the piston 6 and the extension pilot chamber F reduces relatively, and consequently, the pressure control valve 19 is brought into a state where the valve-opening pressure (i.e. relief set pressure) of the main disk 19A is set high. Accordingly, the hydraulic oil flowing into the extension pilot chamber F flows into the extension pressure-receiving chamber G from the oil holes 18C of the lower casing member 18 through the cut portions 21A of the inner disk valve 21, thereby enabling damping force of "hard" damping characteristics to be generated through the cut portions 21A having a small flow path area.

In this case, the cut portions 21A of the inner disk valve 21, which are formed with a small flow path area, can improve the damping force rising characteristics in the low piston speed region and increase the slope of the damping force characteristic curve as shown by the extension characteristic curve 41 in FIG. 9. The hydraulic oil passing through the cut portions 21A of the inner disk valve 21 flows into the extension pressure-receiving chamber G and further flows into the bottom-side oil chamber B from the extension pressure-receiving chamber G through the cut portions 20A of the outer disk valve 20.

Next, as the extension speed of the piston rod 7 gradually increases in the above-described state, the flow rate of hydraulic oil flowing through the oil holes 9F (first orifice 29), which are substantially fully open, increases, and the longitudinal differential pressure in the oil holes 9F increases corresponding to the flow rate. That is, the oil holes 9F stop the increase in pressure in the extension pilot chamber F. Accordingly, the differential pressure between the annular recess 6E of the piston 6 and the extension pilot chamber F also gradually increases. Consequently, the main disk 19A of the pressure control valve 19 opens, and the opening area thereof changes according to the differential pressure ΔP as shown by the characteristic curve 36 in FIG. 6. When the pressure control valve 19 is open, extension damping force substantially proportional to the piston speed is generated as shown by the extension damping force characteristic curve 41 in FIG. 9.

When the damping force characteristics are set to "soft" by rotating the shutter 25 of the passage area varying mechanism 24, the opening area of the oil holes 9F (i.e. the passage area of the first orifice 29) is reduced by the shutter 25 to the level of substantially fully closed as shown by the characteristic curve 34 in FIG. 5, and the opening area of the oil holes 9G (i.e. passage area of the third orifice 30) is increased by the shutter 25 to the level of substantially fully open as shown by the characteristic curve 35, in the same way as the above-described compression stroke.

In this state, the greater part of hydraulic oil flows into the extension pressure-receiving chamber G from the oil grooves 25B of the shutter 25 through the oil holes 9G (third orifice 30), and the pressure (back pressure) in the extension pilot chamber F reduces relatively. Therefore, the differential pressure between the annular recess 6E of the piston 6 and the extension pilot chamber F increases, and consequently, the pressure control valve 19 is brought into a state where the valve-opening pressure (i.e. relief set pressure) of the main disk 19A is set low.

Moreover, at this time, the greater part of hydraulic oil flows directly into the extension pressure-receiving chamber G from the oil holes 9G without flowing into the extension pilot chamber F, i.e. without flowing through the cut portions 21A of the inner disk valve 21, and further flows into the bottom-side oil chamber B through the cut portions 20A of the outer disk valve 20. At this time, damping force of "soft" damping characteristics can be generated as shown by the extension characteristic curve 42 in FIG. 9.

As the extension speed of the piston rod 7 gradually increases in the above-described state, the main disk 19A of the pressure control valve 19, whose relief pressure has been set low as stated above, opens, and the opening area thereof changes according to the differential pressure as shown by the characteristic curve 36 in FIG. 6. When the pressure control valve 19 is open, damping force of "soft" damping characteristics substantially proportional to the piston speed is generated as shown by the extension characteristic curve 42 in FIG. 9.

Thus, according to the first embodiment, the damping force characteristics in the low piston speed region and the relief pressure of the pressure control valves 14 and 19 (main damping valves) can be regulated independently of each other by the variable orifices whose passage area can be externally adjusted (i.e. the first orifices 27 and 29 comprising the oil holes 9C and 9F, respectively, of the stepped rod 9, and the third orifices 28 and 30 comprising the oil holes 9B and 9G, respectively, of the stepped rod 9), and it is possible to increase the degree of freedom for controlling the damping force characteristics.

The characteristics of the first orifices 27 and 29 are set as shown by the characteristic curve 34 in FIG. 5, and the characteristics of the third orifices 28 and 30 are set as shown by the characteristic curve 35. The valve-opening characteristics of the pressure control valves 14 and 19 are set as shown by the characteristic curve 36 in FIG. 6. Further, the valve characteristics of the outer disk valves 15 and 20 are set as shown by the characteristic curve 37 in FIG. 7, and the valve characteristics of the inner disk valves 16 and 21 are set as shown by the characteristic curve 38 in FIG. 8.

Accordingly, the damping force characteristics can be varied linearly from the very low speed region of the piston rod 7 until after the pressure control valve 14 (19) has been relieved, as shown by the characteristic curves 39 to 42 in FIG. 9. Further, the damping force characteristics in the low piston speed region can be smoothly and continuously changed to the damping force characteristics obtained after relieving the pressure control valve 14 (19) by providing gentle valve-opening characteristics for the pressure control valves 14 and 19 as shown by the characteristic curve 36 in FIG. 6.

If the first orifices 27 and 29 are fixed to a predetermined degree of opening, damping force in the low piston speed region can be variably adjusted by the third orifices 28 and 30. If the third orifices 28 and 30 are fixed, the pressure (relief pressure) in the pilot chambers D and F can be variably regulated by the first orifices 27 and 29. Thus, only the relief pressure of the pressure control valves 14 and 19 (main damping valves) can be variably regulated without changing the damping force characteristics in the low piston speed region, and only the damping force characteristics in the low piston speed region can be variably adjusted without changing the relief pressure. In this way, damping force in the low piston speed region and the variable width of relief pressure can be adjusted independently of each other. Regarding the relief pressure, the variable width thereof can be controlled independently for the extension stroke and the compression stroke.

Regarding the method of adjusting damping force characteristics, the adjustment of damping force characteristics in the low piston speed region is made common for the extension and compression strokes and made by controlling the outer disk valves 15 and 20, the orifice area of the inner disk valves 16 and 21 (i.e. the flow path area of the cut portions 15A, 16A, 20A and 21A) and the third orifices 28 and 30. The adjustment of damping force characteristics obtained after relieving the pressure control valves 14 and 19 is made individually for each of the extension and compression strokes by controlling the first orifices 27 and 29 and the main disks 14A and 19A of the pressure control valves 14 and 19. Thus, the damping force characteristics in the low piston speed region, the characteristics after the pressure control valve 19 has been relieved during the extension stroke, and the characteristics after the pressure control valve 14 has been relieved during the compression stroke can be adjusted independently of each other at each position over a range of from "hard" to "soft" damping characteristics.

Therefore, it is possible according to this embodiment to regulate the damping force characteristics in the low piston speed region and the relief pressure independently of each other and hence possible to increase the degree of freedom for tuning the damping force characteristics. Accordingly, it is possible to change only the relief pressure without changing the damping force characteristics in the low piston speed region and also possible to variably adjust only the damping force characteristics in the low piston speed region. Further, because the relief pressure can be adjusted independently for the extension stroke and the compression stroke, it is possible to increase the degree of freedom for tuning the damping force characteristics.

In addition, the use of a two-stage valve comprising the compression outer disk valve 15 and inner disk valve 16 makes it possible to provide linear damping force characteristics in the low piston speed region. Accordingly, damping force can be linearly changed from the very low piston speed region. For the extension stroke also, the use of a two-stage valve comprising the outer disk valve 20 and the inner disk valve 21 offers the same advantageous effect as the above. Moreover, because the degree of freedom for tuning the damping force characteristics is high, it is possible to provide damping force characteristics that even a passive suspension system can handle at each position from "hard" to "soft" characteristics. Regarding the compression outer and inner disk valves 15 and 16 and the extension outer and inner disk valves 20 and 21, if the areas of the respective cut portions of these disk valves are set to satisfy the relationship of the cut portion area of the outer disk valve> the cut portion area of the inner disk valve, the linearity of orifice characteristics can be further improved.

In addition, the control process can be simplified, and it is possible to reduce the cost of a semi-active suspension system. In addition, the use of the pressure control valve structure allows a reduction in the flow rate of hydraulic oil passing through the variable orifices of the shutter and hence enables fluid force to be reduced. Further, it is possible to reduce the axial length of the shock absorber as a shutter-type damping force variable damper.

It should be noted that, in the first embodiment, the first orifices 27 and 29 between the shutter 25 and the pilot chambers D and F are disposed upstream of the pilot chambers D and F to form variable orifices, respectively. However, the present invention is not limited to the described structure. For example, variable orifices may be provided downstream of the associated pilot chambers (i.e. back pressure chambers). This structure also provides the same advantageous effects as those in the first embodiment. The variable orifices in this case are arranged in reverse relation to the variable orifices provided upstream of the associated pilot chambers. That is, the variable orifices may be fully closed for "hard" damping characteristics and fully open for "soft" damping characteristics in the same way as the third orifices 28 and 30 (variable orifices), for example.

Figure 10:
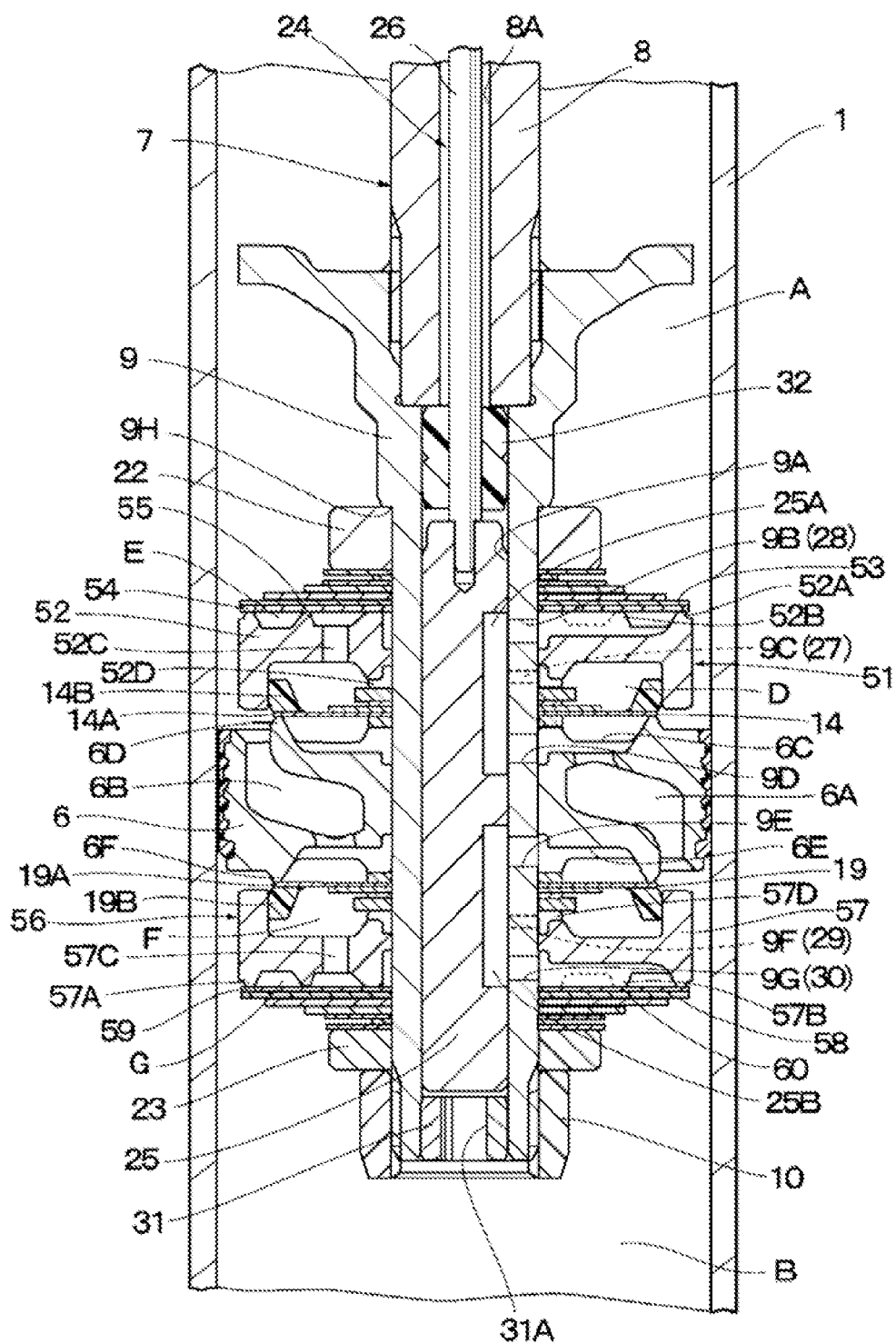
FIG. 10 is a vertical sectional view showing a main part of a damping force control type hydraulic shock absorber according to a second embodiment of the present invention.

FIG. 10 shows a second embodiment of the present invention. The feature of the second embodiment resides in that a first sub-damping valve and a second sub-damping valve are arranged as a single-stage valve comprising a common disk valve. It should be noted that, in the second embodiment, the same constituent elements as those in the above-described first embodiment are denoted by the same reference numerals as those used in the first embodiment, and a description thereof is omitted.

In the figure, reference numeral 51 denotes a compression damping force generating mechanism (hereinafter referred to as "compression damping mechanism 51") used in the second embodiment. The compression damping mechanism 51 has substantially the same structure as that of the compression damping mechanism 12 described in the first embodiment. That is, the compression damping mechanism 51 has an upper casing member 52 in the shape of a cylinder, an upper end of which is closed, and a pressure control valve 14 forming a compression pilot chamber D between the pressure control valve 14 and the upper casing member 52. However, the compression damping mechanism 51 differs from the compression damping mechanism 12 in the first embodiment in that a disk valve 53 (described later) serves as both the outer disk valve 15 and the inner disk valve 16, which have been described in the first embodiment.

The upper casing member 52 of the compression damping mechanism 51 has substantially the same structure as that of the upper casing member 13 described in the first embodiment. That is, the upper casing member 52 is provided with an annular valve seat 52A, a plurality of sectorial valve seats 52B, oil holes 52C as axial oil paths, and oil grooves 52D as radial oil paths. However, the upper casing member 52 in the second embodiment differs from the upper casing member 13 in the first embodiment in that a disk valve 53 (described later) selectively seats on and unseats from both the annular valve seat 52A and the sectorial valve seats 52B.

Reference numeral 53 denotes a common disk valve used as both a first sub-damping valve and a second sub-damping valve. The disk valve 53 is configured as follows. A radially outer part of the disk valve 53 selectively seats on and unseats from the annular valve seat 52A of the upper casing member 52. A radially intermediate part of the disk valve 53 selectively seats on and unseats from the sectorial valve seats 52B. A compression pressure-receiving chamber E is formed between the upper casing member 52 and the disk valve 53 at a position between the annular valve seat 52A and the sectorial valve seats 52B. The compression pressure-receiving chamber E forms a junction located downstream of a second orifice (cut portions 55) and a third orifice 28, which will be described later. The disk valve 53 is provided downstream of the junction.

The disk valve 53 has small cut portions 54 (fixed orifice) constituting a compression fifth orifice between the disk valve 53 and the annular valve seat 52A. The cut portions 54 allow the hydraulic oil in the compression pressure-receiving chamber E to flow toward the rod-side oil chamber A even when the disk valve 53 is closed. The disk valve 53 further has minute cut portions 55 (fixed orifice) constituting a compression second orifice between the disk valve 53 and the sectorial valve seats 52B. It should be noted that the cut portions 54 may be provided in the annular valve seat 52A, and the cut portions 55 may be provided in the sectorial valve seats 52B.

Reference numeral 56 denotes an extension damping force generating mechanism (hereinafter referred to as "extension damping mechanism 56") used in this embodiment. The extension damping mechanism 56 has substantially the same structure as that of the extension damping mechanism 17 described in the first embodiment. That is, the extension damping mechanism 56 has a lower casing member 57 in the shape of a cylinder, a lower end of which is closed, and a pressure control valve 19 forming an extension pilot chamber F as an annular back pressure chamber between the pressure control valve 19 and the lower casing member 57. However, the extension damping mechanism 56 differs from the extension damping mechanism 17 in the first embodiment in that a disk valve 58 (described later) serves as both the outer disk valve 20 and the inner disk valve 21, which have been described in the first embodiment.

The lower casing member 57 of the extension damping mechanism 56 has substantially the same structure as that of the upper casing member 52 of the compression damping mechanism 51. That is, the lower casing member 57 has an annular valve seat 57A, a plurality of sectorial valve seats 57B, oil holes 57C as axial oil paths, and oil grooves 57D as radial oil paths. However, the lower casing member 57 in the second embodiment differs from the first embodiment in that a disk valve 58 (described later) selectively seats on and unseats from both the annular valve seat 57A and the sectorial valve seats 57B.

Reference numeral 58 denotes a common disk valve used as both a first sub-damping valve and a second sub-damping valve. The disk valve 58 is configured as follows. A radially outer part of the disk valve 58 selectively seats on and unseats from the annular valve seat 57A of the lower casing member 57. A radially intermediate part of the disk valve 58 selectively seats on and unseats from the sectorial valve seats 57B. An extension pressure-receiving chamber G is formed between the lower casing member 57 and the disk valve 58 at a position between the annular valve seat 57A and the sectorial valve seats 57B. The extension pressure-receiving chamber G forms a junction located downstream of a second orifice (cut portions 60) and a third orifice 28, which will be described later. The disk valve 58 is provided downstream of the junction.

The disk valve 58 has small cut portions 59 (fixed orifice) constituting an extension fifth orifice between the disk valve 58 and the annular valve seat 58A. The cut portions 59 allow the hydraulic oil in the extension pressure-receiving chamber G to flow toward the bottom-side oil chamber B even when the disk valve 58 is closed. The disk valve 58 further has minute cut portions 60 (fixed orifice) constituting an extension second orifice between the disk valve 58 and the sectorial valve seats 57B.

Thus, the second embodiment arranged as stated above can also provide substantially the same advantageous effects as those obtained in the foregoing first embodiment. Particularly, the second embodiment uses the compression and extension disk valves 53 and 58, each serving as both first and second sub-damping valves. Therefore, it is possible to simplify the structure of the compression and extension damping mechanisms 51 and 56. Accordingly, substantially the same advantageous effects as those of the first embodiment can be realized at an even more reduced cost.

Further, in the second embodiment, the extension disk valve 58, for example, is configured such that the pressure-receiving area with which the disk valve 58 receives the pressure at the insides of the sectorial valve seats 57B is smaller than the pressure-receiving area of the disk valve 58 with respect to the extension pressure-receiving chamber G, and the cut portions 60 and 59 as fixed orifice are positioned in series relation to each other. Therefore, when the rotational position of the shutter 25 is set to "hard" damping characteristics, the damping force characteristic curve in the low piston speed region can be increased in slope and made linear from the very low speed region.

That is, when the shutter 25 is set to "hard" damping characteristics, the oil holes 9F (first orifice 29) of the stepped rod 9 are open, and the oil holes 9G (third orifice 30) are closed. Therefore, the disk valve 58 receives, only at a part thereof inside the sectorial valve seats 57B, the pressure from the shutter 25 (oil grooves 25B) through the extension pilot chamber F. Because the pressure-receiving area of the disk valve 58 is small, the valve-opening pressure (relief pressure) of the disk valve 58 can be adjusted to be high, and the damping force characteristic curve in the low piston speed region can be increased in slope and made linear from the very low speed region.

On the other hand, when the rotational position of the shutter 25 is set to "soft" damping characteristics, the oil holes 9F (first orifice 29) of the stepped rod 9 are closed, and the oil holes 9G (third orifice 30) are open. Therefore, the disk valve 58 receives the pressure of hydraulic oil entering the extension pressure-receiving chamber G from the third orifice 30, and thus the valve-opening pressure (relief pressure) of the disk valve 58 is determined. Moreover, when the cut portions 59 of the disk valve 58 are made larger in flow path area than the inner cut portions 60, the pressure-receiving area of the disk valve 58 is even larger than in the case of "hard" damping characteristics. Therefore, the slope of the damping force characteristic curve in the low piston speed region can be reduced, and the relief pressure can be reduced.

Figure 11:
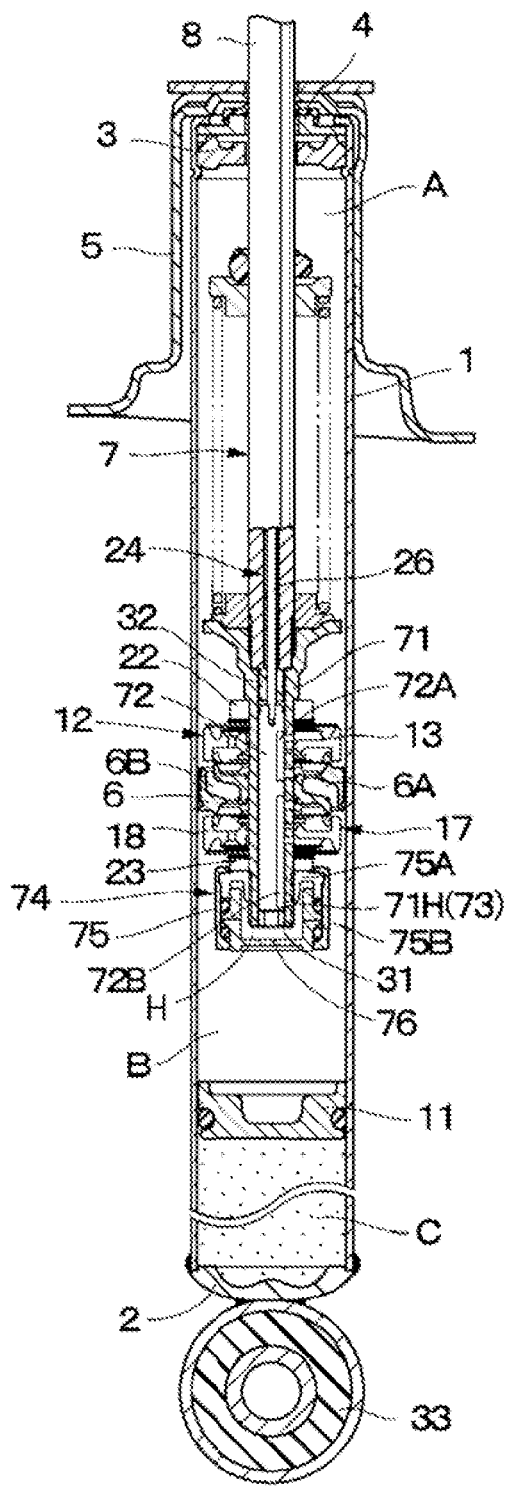
FIG. 11 is a vertical sectional view showing a damping force control type hydraulic shock absorber according to a third embodiment of the present invention.

FIG. 11 shows a third embodiment of the present invention. The feature of the third embodiment resides in that a hydraulic shock absorber is additionally provided with a frequency-dependent mechanism whereby damping force reduces according to the frequency of vibration input to the hydraulic shock absorber. It should be noted that, in the third embodiment, the same constituent elements as those in the above-described first embodiment are denoted by the same reference numerals as those used in the first embodiment, and a description thereof is omitted.

In FIG. 11, reference numeral 71 denotes a stepped rod used in this embodiment. The stepped rod 71 is formed substantially in the same way as the stepped rod 9 described in the first embodiment. That is, the stepped rod 71 constitutes a part of the piston rod 7. The stepped rod 71 in the third embodiment is also provided with a shutter fitting hole and oil holes, which are similar to the shutter fitting hole 9A and oil holes 9B to 9G of the stepped rod 9 shown in FIG. 2.

The stepped rod 71 in the third embodiment is, however, formed longer than the stepped rod 9 in order to install a frequency-dependent mechanism 74 (described later) at the lower end of the stepped rod 71. The stepped rod 71 has a capped nut 75A (described later) screwed onto the lower end thereof, thereby the piston 6 and the stepped rod 71 being secured together. The lower end of the stepped rod 71 is provided with radially extending oil holes 71H communicating with a frequency-sensitive chamber H (descried later).

Reference numeral 72 denotes a shutter used in this embodiment. The shutter 72 has substantially the same structure as that of the shutter 25 described in the first embodiment. That is, the shutter 72 has axially extending oil grooves 72A and 72B formed on the outer periphery thereof. In the third embodiment, however, the oil grooves 72B extend axially to the lower end of the stepped rod 71 to selectively come in and out of communication with the oil holes 71H.

The oil holes 71H and the oil grooves 72B constitute a fourth passage allowing the frequency-sensitive chamber H to communicate with the rod-side oil chamber A. The oil grooves 72B of the shutter 72 and the oil holes 71H of the stepped rod 71, which are provided halfway the fourth passage, constitute a fourth orifice 73 as a variable orifice whose opening area is variably adjusted according to the rotational position of the shutter 72.

Reference numeral 74 denotes a frequency-dependent mechanism provided at the lower end of the stepped rod 71. The frequency-dependent mechanism 74 has a tubular housing 75 displaceable in the cylinder 1, together with the stepped rod 71 as one unit, and a free piston 76 (described later) provided displaceably in and relative to the housing 75. The housing 75 has a capped nut 75A serving as a cap member screwed onto the lower end of the stepped rod 71, and a tubular member 75B.

The capped nut 75A of the housing 75 is provided by being screwed onto the outer periphery of the lower end of the stepped rod 71. The upper end of the tubular member 75B is fitted and secured to the outer periphery of the capped nut 75A. The tubular member 75B of the housing 75 has a free piston 76 (described later) slidably fitted in a part of the tubular member 75B that extends downward from the outer periphery of the capped nut 75A.

Reference numeral 76 denotes a free piston slidably provided in the housing 75. As shown in FIG. 11, the free piston 76 is formed as a tubular piston, a lower end of which is closed. The free piston 76 defines a frequency-sensitive chamber H in the housing 75. The frequency-sensitive chamber H serves as a pressure chamber provided in the fourth passage in series to the fourth orifice 73.

The frequency-sensitive chamber H is closed with respect to the bottom-side oil chamber B outside the housing 75 with a resistive element interposed therebetween. The resistive element is an elastic member, e.g. an O-ring. The free piston 76 is slidably inserted in the frequency-sensitive chamber H. The fourth passage is defined by the free piston 76. No replacement flow of hydraulic oil occurs between the rod-side oil chamber A and the bottom-side oil chamber B, but while the free piston 76 is moving relative to the housing 75, the hydraulic oil in the rod-side oil chamber A flows into the frequency-sensitive chamber H, and the same amount of hydraulic oil is pushed out toward the bottom-side oil chamber B. Therefore, there occurs, practically, a flow of hydraulic oil between the rod-side oil chamber A and the bottom-side oil chamber B.

When the piston 6 in the cylinder 1 vibrates vertically to repeat the extension and compression strokes, together with the piston rod 7, the free piston 76 of the frequency-dependent mechanism 74 is displaced vertically in the housing 75 against the resistive element. At this time, the frequency-dependent mechanism 74 changes the pressures in the bottom-side oil chamber B and the frequency-sensitive chamber H according to the displacement of the free piston 76, thereby changing damping force characteristics so that damping force reduces smoothly according to the input vibration frequency.

The fourth orifice 73, which functions as a variable orifice in response to the operation of the shutter 72, variably controls both the cut-off frequency band (frequency band in which the damping force reduces) of the frequency-dependent mechanism 74 and the damping force reduction rate when high-frequency vibrations are input. In addition, the cut-off frequency band, which changes according to the opening area of the fourth orifice 73, can be changed with smooth characteristics, and damping force reduced at the damping force reduction rate, which also changes according to the opening area of the fourth orifice 73, can be changed with smooth characteristics. When the shutter 72 is operated to close the oil holes 71H of the stepped rod 71 to fully close the fourth orifice 73, the frequency-sensitive chamber H of the frequency-dependent mechanism 74 is cut off from the rod-side oil chamber A. Consequently, the operation of the frequency-dependent mechanism 74 can be stopped.

Thus, according to the third embodiment arranged as stated above, the damping force characteristics can be properly adjusted over a range of from low damping force to high damping force, in the sane way as the first embodiment, by the compression and extension damping mechanisms 12 and 17 and the shutter 72 of the passage area varying mechanism 24. Moreover, in the third embodiment, the frequency-dependent mechanism 74 is additionally provided. Therefore, damping force control can be smoothly performed by a combination of these mechanisms, and the vehicle ride quality can be further improved.

Further, the areas of the second to fourth passages can be adjusted independently of each other by the shutter 72 of the passage area varying mechanism 24. Therefore, no matter to which one of "hard", "medium" and "soft" damping characteristics the damping force to be generated by the damping force control type shock absorber is changed, the cut-off frequency band and the damping force reduction rate of the frequency-dependent mechanism 74, which comprises the free piston 76 and so forth, can be freely changed according to each of the damping force characteristics selected. Thus, it is possible to appropriately realize damping force control that takes account of the vehicle ride quality and damping force control taking the steering stability into account.

Further, even in a high-frequency region where damping force is difficult to regulate, no complicated control is needed because damping force can be reduced by controlling the cut-off frequency band and the damping force reduction rate of the frequency-dependent mechanism 74. Accordingly, a spec-down of the control CPU results in a less costly structure. Because the control frequency is low, the third embodiment is also advantageous in terms of durability.

Figure 12:
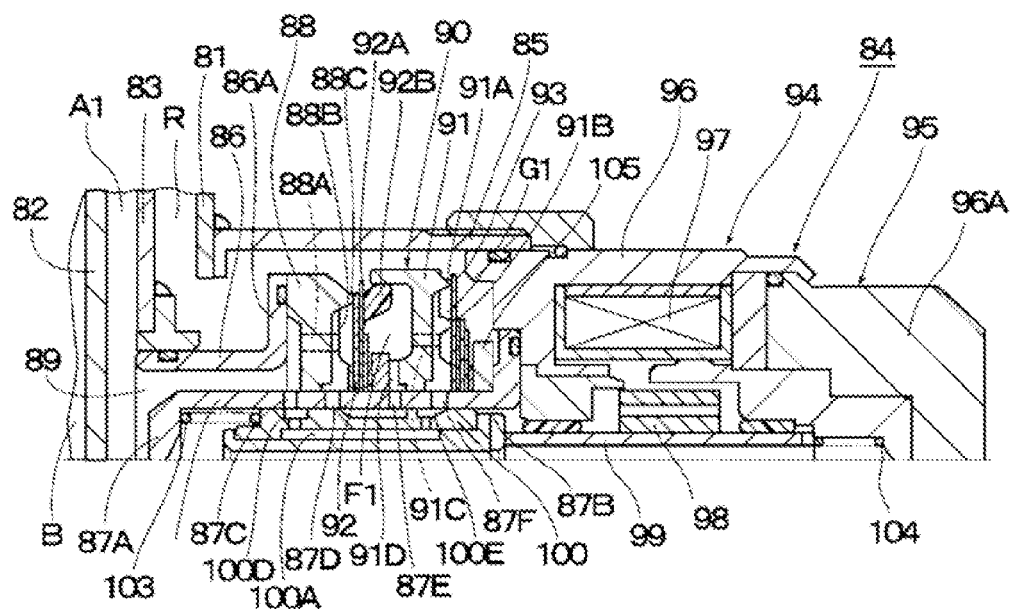
FIG. 12 is a fragmentary sectional view showing a main part of a damping force control type hydraulic shock absorber according to a fourth embodiment of the present invention.
Figure 13:
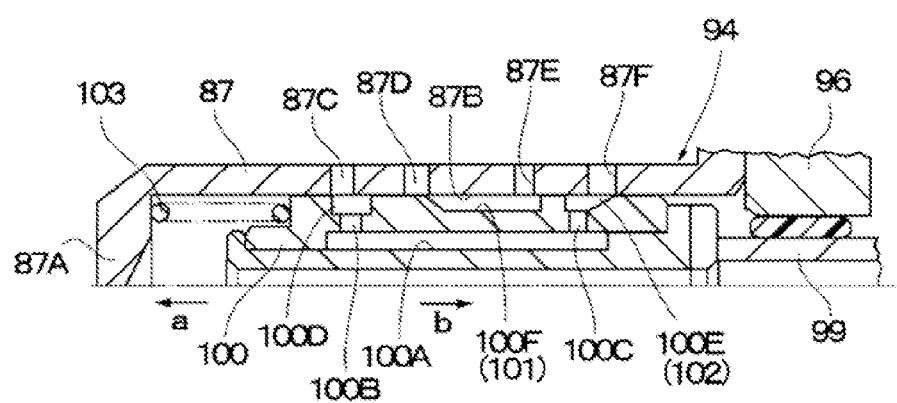
FIG. 13 is an enlarged sectional view showing a sleeve member, a spool, and so forth in FIG. 12.

FIGS. 12 and 13 show a fourth embodiment of the present invention. The feature of the fourth embodiment resides in that the actuator of the passage area varying mechanism comprises an electromagnetic proportional solenoid, and that a passage area varying member is rectilinearly moved (displaced) in the axial direction.

It should be noted that, in the fourth embodiment, the same constituent elements as those in the above-described first embodiment are denoted by the same reference numerals as those used in the first embodiment, and a description thereof is omitted. In the fourth embodiment, the present invention will be explained with regard to a twin-tube hydraulic shock absorber comprising an outer tube 81 and an inner tube 82, by way of example, unlike the first embodiment using a mono-tube hydraulic shock absorber.

The inner tube 82, which serves as a cylinder, is fitted therein with a piston 6 (see FIG. 2) substantially in the same way as the first embodiment. The interior of the inner tube 82 is divided into two chambers, i.e. a rod-side oil chamber (not shown) and a bottom-side oil chamber B. An annular reservoir chamber R is formed between the outer tube 81 and the inner tube 82. The reservoir chamber R communicates with the bottom-side oil chamber B in the inner tube 82 through a bottom valve (not shown) and so forth. Accordingly, during the extension stroke of the piston rod, for example, the hydraulic oil in the rod-side oil chamber flows into the reservoir chamber R through an annular oil chamber A1, an annular passage 89, a damping force control valve 84, etc., which will be described later. The hydraulic oil flowing into the reservoir chamber R flows therefrom into the bottom-side oil chamber B. As a result, the hydraulic oil in the rod-side oil chamber flows toward the bottom-side oil chamber B.

Reference numeral 83 denotes an intermediate tube disposed between the outer tube 81 and the inner tube 82. The intermediate tube 83 forms between itself and the inner tube 82 an annular oil chamber A1 surrounding the entire outer periphery of the inner tube 82. The annular oil chamber A1 constantly communicates with the rod-side oil chamber in the inner tube 82 through a radial oil hole (not shown) formed in an upper end portion of the inner tube 82. Accordingly, the annular oil chamber A1 functions as a part of the rod-side oil chamber.

Reference numeral 84 denotes a damping force control valve provided on the outer periphery of a lower end portion of the outer tube 81. The damping force control valve 84 has a substantially circular cylindrical valve casing 85, a tubular holder 86, a sleeve member 87 in the shape of a circular cylinder, one end of which is closed, and so forth. The substantially circular cylindrical valve casing 85 has a proximal end secured to the outer periphery of the lower end portion of the outer tube 81. The distal end of the valve casing 85 projects radially outward from the outer tube 81. The tubular holder 86 has a proximal end secured to a lower end portion of the intermediate tube 83, thereby the holder 86 being disposed inside the valve casing 85 with an annular gap therebetween. The tubular holder 86 positions a valve member 88 (described later) in the valve casing 85. The circular cylindrical sleeve member 87 is positioned in the valve casing 85 through a solenoid casing 96 (described later).

The tubular holder 86 is provided at a distal end thereof with an annular flange portion 86A bent in a substantially L shape. A valve member 88 is secured to the flange portion 86A in such a manner as to abut against the latter. The valve member 88 is fitted to the outer periphery of the sleeve member 87. An annular passage 89 is formed between the tubular holder 86 and the sleeve member 87. One end of the annular passage 89 communicates with the annular oil chamber A1, and the other end of the annular passage 89 extends to the position of the valve member 88.

The valve member 88 has a plurality of circumferentially spaced oil paths 88A extending in the axial direction of the sleeve member 87. One end of each of the oil paths 88A constantly communicates with the annular passage 89. The other end surface of the valve member 88 is provided with an annular recess 88B surrounding the other end openings of the oil paths 88A and also provided with an annular valve seat 88C located radially outside the annular recess 88B. A main disk 92A (described later) selectively seats on and unseats from the annular valve seat 88C. The oil paths 88A of the valve member 88 constitute a first passage allowing the hydraulic oil to flow between the annular passage 89, which communicates with the annular oil chamber A1 (rod-side oil chamber), and the reservoir chamber R through the main disk 92A.

A spool 100 is slidably fitted to the inner periphery of the sleeve member 87. One end of the sleeve member 87 is closed with respect to the annular passage 89 by a cap portion 87A. The other end of the sleeve member 87 forms a spool sliding hole 87B opening into a solenoid casing 96 (described later). The sleeve member 87 is provided with axially spaced groups of circumferentially spaced oil holes 87C, 87D, 87E and 87F extending radially outward from the spool sliding hole 87B. Among the oil holes 87C to 87F, the oil holes 87C constantly communicate with the annular passage 89. The oil holes 87D constantly communicate with the annular recess 88B of the valve member 88. The oil holes 87E constantly communicate with a pilot chamber F1 (described later), and the oil holes 87F constantly communicate with a pressure-receiving chamber G1 (described later).

Reference numeral 90 denotes a damping force generating mechanism (hereinafter referred to as "damping mechanism 90") used in this embodiment. The damping mechanism 90 is attached to the outer periphery of the sleeve member 87 in the valve casing 85. When a piston (not shown) is slidingly displaced in the inner tube 82 during the extension and compression strokes of a piston rod (not shown), the hydraulic oil flows from the rod-side oil chamber, the annular oil chamber A1 and the annular passage 89 toward the reservoir chamber R through the oil paths 88A and annular recess 88B of the valve member 88 and the oil holes 87C to 87F of the sleeve member 87, oil grooves 100E and 100F of a spool 100 (described later), and so forth. At this time, the damping mechanism 90 offers resistance to the hydraulic oil flowing from the rod-side oil chamber toward the reservoir chamber R to generate a predetermined damping force.

The damping mechanism 90 has a tubular pilot casing member 91, one end of which is closed, a pressure control valve 92, a disk valve 93 (described later), and so forth. The tubular pilot casing member 91 is secured to the outer periphery of the sleeve member 87 between a spacer 105 (described later) and the valve member 88. The pressure control valve 92 has an elastic seal member 92B (described later) fitted to the inner peripheral surface of the pilot casing member 91 with an interference. The pressure control valve 92 forms an annular extension pilot chamber F1 as a back pressure chamber between the pressure control valve 92 and the pilot casing member 91.

The pilot casing member 91 of the damping mechanism 90 has substantially the same structure as that of the upper casing member 13 of the compression damping mechanism 12 described in the first embodiment. That is, the pilot casing member 91 has, as illustrated in FIG. 12, an annular valve seat 91A, a plurality of sectorial valve seats 91B, oil holes 91C as axial oil paths, and oil grooves 91D as radial oil paths. The pressure control valve 92 has the same structure as that of the pressure control valve 14 described in the first embodiment. That is, the pressure control valve 92 has a main disk 92A selectively seating on and unseating from the annular valve seat 88C of the valve member 88 and an annular elastic seal member 92B secured to the outer periphery of the main disk 92A. The pressure control valve 92 constitutes an extension and compression main damping valve, which is a constituent feature of the present invention.

The pressure control valve 92 operates as follows. When a pressure difference between the annular passage 89 (annular recess 88B) and the pilot chamber F1 increases to a predetermined set value during the extension and compression strokes of the piston rod 7, the main disk 92A unseats from the annular valve seat 88C to generate a predetermined damping force. When the pressure control valve 92 (main disk 92A) opens, the inside (annular passage 89) of the tubular holder 86 and the reservoir chamber R outside the tubular holder 86 communicate with each other through the oil paths 88A and annular recess 88B of the valve member 88. Thus, a first passage, which is a constituent feature of the present invention, is formed.

Reference numeral 93 denotes a disk valve constituting a part of the damping mechanism 90. The disk valve 93 has substantially the same structure as that of the disk valve 58 described in the second embodiment. That is, the disk valve 93 constitutes a common disk valve used as both a first sub-damping valve and a second sub-damping valve. The disk valve 93 is configured as follows. A radially outer part of the disk valve 93 selectively seats on and unseats from the annular valve seat 91A of the pilot casing member 91, and a radially intermediate part of the disk valve 93 selectively seats on and unseats from the sectorial valve seats 91B. A pressure-receiving chamber G1 is formed between the pilot casing member 91 and the disk valve 93 at a position between the annular valve seat 91A and the sectorial valve seats 91B.

Reference numeral 94 denotes a passage area varying mechanism used in this embodiment. Reference numeral 95 denotes an electromagnetic proportional solenoid (hereinafter referred to as "proportional solenoid 95") constituting an actuator of the passage area varying mechanism 94. The proportional solenoid 95 has a solenoid casing 96, a tubular coil part 97, a movable core 98, and an output tubular member 99 as an output member. The solenoid casing 96 is fitted at one axial end thereof to the valve casing 85 and closed at the other axial end by a cap member 96A. The tubular coil part 97 is accommodated in the solenoid casing 96. The movable core 98 is displaceably provided at the inner periphery of the coil part 97. The output tubular member 99 is secured to the center of the movable core 98.

The proportional solenoid 95 operates as follows. When an electric current is externally supplied to the coil part 97, the movable core 98 and the output tubular member 99 are axially displaced together against springs 103 and 104 (described later). At this time, the amount of axial displacement of the output tubular member 99 is controlled in proportion to the value of electric current flowing through the coil part 97. Thus, a spool 100 (described later) is slidingly displaced in the directions of the arrows a and b shown in FIG. 13 (i.e. in the axial direction) in the spool sliding hole 87B of the sleeve member 87.

Reference numeral 100 denotes a spool used as an opening area varying member in this embodiment. The spool 100 is, as shown in FIG. 13, slidably provided in the spool sliding hole 87B of the sleeve member 87. The spool 100 constitutes flow control valves from variable orifices 27, 28, 29 and 30, which will be descried later. The spool 100 is rectilinearly moved along the axial direction in the spool sliding hole 87B by the output tubular member 99 of the proportional solenoid 95. The spool 100 is provided with an axially extending annular inner passage portion 100A, axially spaced passage holes 100B and 100C extending from the inner passage portion 100A outward in the radial direction of the spool 100, and annular oil grooves 100D and 100E formed on the outer peripheral surface of the spool 100, which are spaced from each other in the axial direction of the spool 100. The oil grooves 100D and 100E constantly communicate with the inner passage portion 100A through the passage holes 100B and 100C, respectively. The spool 100 is further provided with another oil groove 100F formed on the outer peripheral surface of the spool 100 at a position between the oil grooves 100D and 100E.

The oil groove 100D of the spool 100 communicates with the annular passage 89 through the oil holes 87C of the sleeve member 87. Accordingly, the hydraulic oil flowing through the annular passage 89 is supplied into the inner passage portion 100A through the oil holes 87C, the oil groove 100D and the passage holes 100B. The hydraulic oil in the inner passage portion 100A is supplied into the annular oil groove 100E through the passage holes 100C. The oil groove 100E is selectively brought into and out of communication with the pressure-receiving chamber G1 through the oil holes 87F of the sleeve member 87 when the spool 100 is slidingly displaced in the directions of the arrows a and b.

The oil groove 100F of the spool 100 selectively enables and disables communication between the oil holes 87D and 87E of the sleeve member 87 according to the displacement of the spool 100. The oil groove 100F of the spool 100 and the oil holes 87D and 87E of the sleeve member 87 constitute a second passage, which is a constituent feature of the present invention, together with the annular passage 89, which communicates with the rod-side oil chamber, the oil paths 88A and annular recess 88B of the valve member 88, the oil grooves 91D of the pilot casing member 91, the pilot chamber F1, the oil holes 91C, and so forth.

The oil groove 100F of the spool 100 and the oil holes 87D of the sleeve member 87, which are provided halfway the second passage, constitute a first orifice 101 as a variable orifice whose opening area is variably adjusted according to the sliding position of the spool 100. In addition, the disk valve 93 has cut portions (not shown) in a radially intermediate part thereof. The cut portions form a fixed orifice that constitutes a second orifice.

The inner passage portion 100A, passage holes 100B and 100C and oil grooves 100D and 100F of the spool 100 constitute a third passage, which is a constituent feature of the present invention, together with the annular passage 89, which communicates with the rod-side oil chamber, the oil holes 87C and 87F of the sleeve member 87, the pressure-receiving chamber G1 between the pilot casing member 91 and the disk valve 93, and so forth. The oil groove 100E of the spool 100 and the oil holes 87F of the sleeve member 87, which are provided halfway the third passage, constitute a third orifice 102 as a variable orifice whose opening area is variably adjusted according to the sliding position of the spool 100. In addition, the disk valve 93 has cut portions (not shown) on the outer periphery thereof. The cut portions form a fixed orifice that constitutes a fifth orifice.

A return spring 103 is provided between the cap portion 87A of the sleeve member 87 and one end of the spool 100. The return spring 103 constantly urges the spool 100 in the direction of the arrow b toward the output tubular member 99 of the proportional solenoid 95. A spring 104 is provided between the cap member 96A of the solenoid casing 96 and the output tubular member 99 to constantly urge the output tubular member 99, together with the movable core 98, in the direction of the arrow a. The spring 104 has a smaller spring force than the return spring 103, so that when the proportional solenoid 95 is deenergized, the spool 100 is returned to the initial position shown in FIGS. 12 and 13 by the return spring 103. It should be noted that an annular spacer 105 is provided around the outer periphery of the sleeve member 87 at a position between the valve member 88 of the damping mechanism 90 and the solenoid casing 96 of the proportional solenoid 95.

Thus, the fourth embodiment arranged as stated above also allows the opening areas of the first orifice 101 and the third orifice 102, which are variable orifices, to be variably adjusted by slidingly displacing (rectilinearly moving) the spool 100 axially with the output tubular member 99 of the proportional solenoid 95. Accordingly, it is possible to obtain substantially the same advantageous effects as those in the foregoing first embodiment. Particularly, the fourth embodiment uses the proportional solenoid 95 as an actuator of the passage area varying mechanism 94. Therefore, damping force can be controlled continuously, and damping force control of higher accuracy can be performed. Accordingly, high control effects can be obtained.

In the fourth embodiment, the present invention has been explained by way of an example in which the proportional solenoid 95 is provided as an actuator in the damping force control valve 84 provided in a twin-tube hydraulic shock absorber comprising the outer tube 81 and the inner tube 82. However, the present invention is not limited to the described arrangement. For example, a proportional solenoid may also be applied as an actuator of a passage area varying mechanism to a mono-tube hydraulic shock absorber as described in the first to third embodiments. In this case, a proportional solenoid can be provided inside the cylinder (e.g. in the piston rod). Therefore, it is possible to improve the installability of the damping force control type shock absorber to the vehicle. That is, the damping force control type shock absorber can be installed without the actuator projecting into the engine room. Thus, it is possible to realize space-saving and safe installation of the damping force control type shock absorber.

In the first embodiment, the present invention has been explained by way of an example in which the outer disk valve 15 and the inner disk valve 16 are provided in the compression damping mechanism 12. However, the present invention is not limited to the described arrangement. For example, the arrangement may be such that the outer disk valve 15 and the inner disk valve 16 are omitted, but instead, the oil holes 13C of the upper casing member 13 are modified to serve as a compression fixed orifice (second orifice). A similar modification may also be made to the extension damping mechanism 17. It is also possible to make a similar modification to the second and third embodiments.

In the first embodiment, the present invention has been explained by way of an example in which a single shutter 25 is used to variably adjust the passage area of each of the second and third passages. However, the present invention is not limited to the described arrangement. For example, the arrangement may be such that the passage areas of the second and third passages are adjusted separately from each other by using respective shutters. The arrangement may also be such that shutters provided respectively for the second and third passages are rotated with respective actuators. The shutter of the passage area varying mechanism may be rotated by hand but not with an actuator. The same goes for the second and third embodiments. In the fourth embodiment, the sliding position of the spool 100 may be adjusted by hand.

In the foregoing embodiments, the present invention has been explained by taking a damping force control type hydraulic shock absorber as an example of a damping force control type shock absorber provided in a vehicle such as an automobile. However, the present invention is not limited to the above but may also be applied, for example, to damping force control type shock absorbers for use in various machines, architectural structures, etc. which constitute vibration sources.

As has been stated in the foregoing embodiment, the damping force control type shock absorber according to the present invention may have a fourth passage through which a hydraulic fluid flows from either one of two chambers in a cylinder toward the other chamber in response to movement of a piston in one direction, a fourth orifice provided in the fourth passage, a pressure chamber provided in the fourth passage in series to the fourth orifice, and a free piston slidably inserted in the pressure chamber. Thus, the free piston is displaced in the pressure chamber in response to vibration or the like of the vehicle to obtain damping force characteristics depending on the vibration frequency. The combination of the frequency-dependent mechanism with the damping force control mechanism enables damping force to be controlled smoothly and allows a further improvement in the vehicle ride quality.

According to the present invention, the fourth orifice may be an externally adjustable variable orifice. Consequently, the fourth orifice can be added as a variable orifice to the variable orifices serving as at least either one of the first and second orifices and the third orifice. Accordingly, damping forces obtained respectively by the frequency-dependent mechanism and the damping force control mechanism can be controlled separately from each other.

According to the present invention, the plurality of externally adjustable variable orifices may be driven with a single actuator. Consequently, the variable orifices of the frequency-dependent mechanism and the damping force control mechanism can be driven with a single actuator. In addition, according to the present invention, the plurality of externally adjustable variable orifices may be flow control valves. Thus, the flow rate of hydraulic fluid passing through each variable orifice can be variably regulated.

According to the present invention, the second and third passages may be joined downstream of the second and third orifices, and a first sub-damping valve is provided downstream of the junction of the second and third passages. Thus, the first sub-damping valve can be positioned in series to the second and third orifices downstream of the junction of the second and third passage. In addition, according to the present invention, the first sub-damping valve may be provided with a fifth orifice, which is a fixed orifice. Thus, the fifth orifice of the first sub-damping valve and the second and third orifices can be positioned in series relation to each other.

According to the present invention, the second orifice may be a fixed orifice, and a second sub-damping valve may be provided in parallel to the second orifice. Thus, the second orifice and the fifth orifice can be positioned in series relation to each other, which makes it possible to provide linear damping force characteristics in the low piston speed region. Accordingly, damping force can be linearly varied from the very low piston speed region. In addition, damping force generated by the second sub-damping valve can be variably adjusted by the variable orifice.

According to the present invention, the first and second sub-damping valves may have respective pressure-receiving chambers and a common disk valve that closes the pressure-receiving chambers. In this case, the common disk valve, which is used as both the first and second sub-damping valves, can allow simplification of the structure of the damping force generating mechanism. Accordingly, the above-described advantageous effects can be realized at a further reduced cost.

In addition, according to the present invention, the second orifice may be a fixed orifice, and the first and third orifices, which are variable orifices, are arranged such that, when the flow path area of the first orifice increases, the flow path area of the third orifice is reduced, and when the flow path area of the third orifice increases, the flow path area of the first orifice is reduced. Thus, when the flow path area of the first orifice increases, the pressure in the back pressure chamber is relatively increased to increase the relief set pressure, thereby obtaining "hard" damping force characteristics, and the slope of the damping force characteristic curve in the low piston speed region can be increased by the second orifice, which is a fixed orifice. On the other hand, when the flow path area of the first orifice reduces, the pressure in the back pressure chamber is relatively reduced to decrease the relief set pressure, thereby obtaining "soft" damping force characteristics, and the slope of the damping force characteristic curve in the low piston speed region can be reduced by the third orifice.

In addition, according to the present invention, passages, orifices and damping valves similar to those described above may be also provided for the movement of the piston in the other direction. Consequently, damping force characteristics can be variably adjusted during each of the extension and compression strokes of the piston rod. Thus, the vehicle ride quality can be surely improved. In addition, the relief pressure can be controlled independently for the extension stroke and the compression stroke. Accordingly, it is possible to increase the degree of freedom for tuning the damping force characteristics.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2010-292241 filed on Dec. 28, 2010.

The entire disclosure of Japanese Patent Application No. 2010-292241 filed on Dec. 28, 2010 including specification, claims, drawings and summary is incorporated herein by reference in its entirety.

What is claimed is:

1. A damping force control type shock absorber comprising:
    a cylinder having a hydraulic fluid sealed therein;
    a piston movably fitted in the cylinder to define two chambers in the cylinder;
    a piston rod secured at one end thereof to the piston, the other end of the piston rod projecting out of the cylinder;
    a first passage, a second passage and a third passage, through which the hydraulic fluid flows from either one of the two chambers in the cylinder toward the other of the two chambers in response to movement of the piston in one direction;
    a main damping valve provided in the first passage to regulate a flow of the hydraulic fluid induced by movement of the piston to generate a damping force;
    a first orifice provided in the second passage;

a second orifice provided in the second passage downstream of the first orifice;

a back pressure chamber supplied with a pressure between the first orifice and the second orifice to urge the main damping valve in a direction for closing the main damping valve, the back pressure chamber being provided in the second passage; and a third orifice provided in the third passage;

wherein at least one of the first orifice and the second orifice is an externally adjustable variable orifice, wherein the third orifice is an externally adjustable variable orifice, and wherein the second passage and the third passage are joined downstream of the second orifice and the third orifice, and a first sub-damping valve is provided downstream of where the second passage and the third passage are joined.

2. The damping force control type shock absorber of claim 1, further comprising:

a fourth passage through which the hydraulic fluid flows from either one of the two chambers in the cylinder toward the other of the two chambers in response to movement of the piston in one direction;

a fourth orifice provided in the fourth passage;

a pressure chamber provided in the fourth passage in series to the fourth orifice; and a free piston slidably inserted in the pressure chamber.

3. The damping force control type shock absorber of claim 2, wherein the fourth orifice is an externally adjustable variable orifice.

4. The damping force control type shock absorber of claim 1, wherein the externally adjustable variable orifices are driven with a single actuator.

5. The damping force control type shock absorber of claim 4, wherein the externally adjustable variable orifices are flow control valves.

6. The damping force control type shock absorber of claim 1, further comprising:

a fourth passage through which the hydraulic fluid flows from either one of the two chambers in the cylinder toward the other of the two chambers in response to movement of the piston in one direction;

a fourth orifice provided in the fourth passage;

a pressure chamber provided in the fourth passage; and a free piston slidably inserted in the pressure chamber, wherein the first sub-damping valve is provided with a fifth orifice that is a fixed orifice.

7. The damping force control type shock absorber of claim 6, wherein the second orifice is a fixed orifice, and a second sub-damping valve is provided in parallel to the second orifice.

8. The damping force control type shock absorber of claim 7, wherein the first sub-damping valve and the second sub-damping valve have respective pressure-receiving chambers and a common disk valve that is capable of closing the pressure-receiving chambers.

9. The damping force control type shock absorber of claim 1, wherein the second orifice is a fixed orifice, and the first orifice and the third orifice, which are variable orifices, are configured such that, when a flow path area of the first orifice increases, a flow path area of the third orifice is reduced, whereas, when the flow path area of the third orifice increases, the flow path area of the first orifice is reduced.

10. The damping force control type shock absorber of claim 1, wherein the first passage, the second passage, the third passage, the main damping valve, the first orifice, the second orifice, and the third orifice are also provided for movement of the piston in the other direction.

11. The damping force control type shock absorber of claim 1, wherein:

the piston rod includes a stepped rod at the end of thereof secured to the piston;

the stepped rod includes a shutter fitting hole and a shutter provided in the shutter fitting hole of the stepped rod; and the variable orifices each has a fluid groove on the shutter and a fluid hole in the stepped rod, so that opening areas of the variable orifices can be changed according to a rotational position of the shutter.

* * * * *